United States Patent
Agiwal

(10) Patent No.: US 11,696,339 B2
(45) Date of Patent: Jul. 4, 2023

(54) SYSTEM AND METHOD OF SELECTING RACH OCCASIONS FOR SYSTEM INFORMATION REQUEST

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/503,109

(22) Filed: Oct. 15, 2021

(65) Prior Publication Data

US 2022/0039172 A1 Feb. 3, 2022

Related U.S. Application Data

(63) Continuation of application No. 16/534,984, filed on Aug. 7, 2019, now Pat. No. 11,153,912.

(60) Provisional application No. 62/715,488, filed on Aug. 7, 2018.

(51) Int. Cl.
  *H04W 74/08* (2009.01)
  *H04W 56/00* (2009.01)
  *H04W 72/23* (2023.01)

(52) U.S. Cl.
  CPC ..... *H04W 74/0833* (2013.01); *H04W 56/001* (2013.01); *H04W 72/23* (2023.01)

(58) Field of Classification Search
  CPC H04W 74/0833; H04W 56/001; H04W 72/14
  See application file for complete search history.

(56) References Cited

U.S. PATENT DOCUMENTS

| | | |
|---|---|---|
| 2018/0167979 A1 | 6/2018 | Guo et al. |
| 2018/0220288 A1 | 8/2018 | Agiwal et al. |
| 2018/0270115 A1 | 9/2018 | Mallick et al. |
| 2018/0368167 A1 | 12/2018 | Kim et al. |

(Continued)

FOREIGN PATENT DOCUMENTS

| | | |
|---|---|---|
| CN | 108012329 A | 5/2018 |
| KR | 10-2017-0114971 A | 10/2017 |

(Continued)

OTHER PUBLICATIONS

Samsung (Email Rapporteur), "Email Discussion [101bis#43] [NR]—RA resources for MSG1 on demand request", 3GPP TSG-RAN2 102, May 21-25, 2018, R2-1807690, 13 pages.

(Continued)

*Primary Examiner* — Shukri Taha

(57) ABSTRACT

A method of a UE is provided. The method includes receiving, from a base station, configuration information for a system information (SI) request by higher layer signaling, the configuration information including information on a SI request period comprising of a number of association period; identifying information on a SI request resource corresponding to a SI message based on the configuration information, the information on the SI request resource including an index of an association period in the SI request period, information on a random access preamble, and information on a RACH occasion; and transmitting, to the base station, the SI request for the SI message based on the information on the SI request resource.

20 Claims, 17 Drawing Sheets

(56) References Cited

U.S. PATENT DOCUMENTS

| | | | |
|---|---|---|---|
| 2019/0053281 | A1 | 2/2019 | Astrom et al. |
| 2019/0069322 | A1* | 2/2019 | Davydov .............. H04L 5/0091 |
| 2019/0208550 | A1* | 7/2019 | Ko ....................... H04L 5/0053 |
| 2019/0223082 | A1 | 7/2019 | He et al. |
| 2019/0230713 | A1 | 7/2019 | Geng et al. |
| 2019/0327764 | A1 | 10/2019 | Yoo et al. |
| 2019/0387550 | A1 | 12/2019 | Pan et al. |
| 2020/0022067 | A1 | 1/2020 | Pan et al. |
| 2020/0305197 | A1 | 9/2020 | Kim et al. |
| 2021/0105702 | A1 | 4/2021 | Jiang |

FOREIGN PATENT DOCUMENTS

| | | | |
|---|---|---|---|
| WO | 2018/129123 | A1 | 7/2018 |
| WO | 2018/130873 | A2 | 7/2018 |

OTHER PUBLICATIONS

Spreadtrum Communications, "Msg1-based on-demand SI request", 3GPP TSG RAN WG2#101Bis, Apr. 16-20, 2018, R2-1804469, 5 pages.

ZTE et al., "Remaining details of RACH procedure", 3GPP TSG RAN WG1 Meeting #91, Nov. 27-Dec. 1, 2017, R1-1719346, 30 pages.

ZTE et al., "Remaining details of RACH procedure", 3GPP TSG RAN WG1 Meeting #92, Feb. 26-Mar. 2, 2018, R1-1801410, 12 pages.

ZTE et al., "Remaining details of RACH procedure", 3GPP TSG RAN WG1 Meeting AH 1801, Jan. 22-26, 2018, R1-1800084, 12 pages.

Supplementary European Search Report dated Jul. 19, 2021 in connection with European Patent Application No. 19 84 8375, 12 pages.

ISA/KR, International Search Report and Written Opinion of the International Searching Authority, International Application No. PCT/KR2019/009925, dated Nov. 13, 2019, 8 pages.

ZTE Corporation, Report of Offline Discussion #17: RACH resources for SI request, R2-1810886, 3GPP TSG-RAN2 NR AH-1807, Montreal, Canada, Jul. 2-6, 2018, 10 pages.

Examination report dated Nov. 14, 2022, in connection with Indian Application No. 202137000902, 6 pages.

* cited by examiner

SYSTEM AND METHOD OF SELECTING RACH OCCASIONS FOR SYSTEM INFORMATION REQUEST

CROSS-REFERENCE TO RELATED APPLICATION

This application is a continuation of U.S. patent application Ser. No. 16/534,984 filed on Aug. 7, 2019, which is based on and claims priority under 35 U.S.C. § 119 to U.S. Provisional Patent Application No. 62/715,488, filed on Aug. 7, 2018, in the U.S. Patent and Trademark Office, the disclosures of which are herein incorporated by reference in their entirety.

BACKGROUND

1. Field

The disclosure relates to a wireless communication system. More particularly, the disclosure relates to a method and apparatus for selecting RACH Occasions for System Information Request.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "beyond 4G network" or a "post LTE system." In 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the Big Data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, multiple-input multiple-output (MIMO), and array antennas. Application of a cloud radio access network (RAN) as the above-described Big Data processing technology may also be considered to be as an example of convergence between the 5G technology and the IoT technology.

The above information is presented as background information only to assist with an understanding of the disclosure. No determination has been made, and no assertion is made, as to whether any of the above might be applicable as prior art regarding the disclosure.

SUMMARY

Aspects of the disclosure are to address at least the above-mentioned problems and/or disadvantages and to provide at least the advantages described below.

Additional aspects will be set forth in part in the description which follows and, in part, will be apparent from the description, or may be learned by practice of the presented embodiments.

In accordance with an aspect of the disclosure, a method of a user equipment (UE) in a wireless communication system is provided. The method includes receiving, from a base station, configuration information for a system information (SI) request by higher layer signaling, the configuration information including information on a SI request period comprising of a number of association period; identifying information on a SI request resource corresponding to a SI message based on the configuration information, the information on the SI request resource including an index of an association period in the SI request period, information on a random access preamble, and information on a RACH occasion; and transmitting, to the base station, the SI request for the SI message based on the information on the SI request resource.

In accordance with an aspect of the disclosure, a method of a base station in a wireless communication system is provided. The method includes transmitting, to a user equipment (UE), configuration information for a system information (SI) request by higher layer signaling, the configuration information including information on a SI request period comprising of a number of association period and information on a SI request resource corresponding to a SI message; and receiving, from the UE, the SI request for the SI message based on the information on the SI request resource, wherein the information on the SI request resource including an index of an association period in the SI request period, information on a random access preamble, and information on a RACH occasion.

In accordance with an aspect of the disclosure, a UE in a wireless communication system is provided. The UE includes a transceiver configured to transmit and receive signals; and at least one processor operably connected to the transceiver, the processor configured to: control the transceiver to receive, from a base station, configuration information for a system information (SI) request by higher layer signaling, the configuration information including information on a SI request period comprising of a number of association period; identify information on a SI request resource corresponding to a SI message based on the configuration information, the information on the SI request resource including an index of an association period in the SI request period, information on a random access preamble, and information on a RACH occasion; and control the transceiver to transmit, to the base station, the SI request for the SI message based on the information on the SI request resource.

In accordance with an aspect of the present disclosure, a base station in a wireless communication system is provided. The base station includes a transceiver configured to transmit and receive signals; and at least one processor operably connected to the transceiver, the processor configured to control the transceiver to transmit, to a user equipment (UE), configuration information for a system information (SI) request by higher layer signaling, the configuration information including information on a SI request period comprising of a number of association period and information on a SI request resource corresponding to a SI message; and receive from the UE, the SI request for the SI message based on the information on the SI request resource, wherein the information on the SI request resource including an index of an association period in the SI request period, information on a random access preamble, and information on a RACH occasion.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
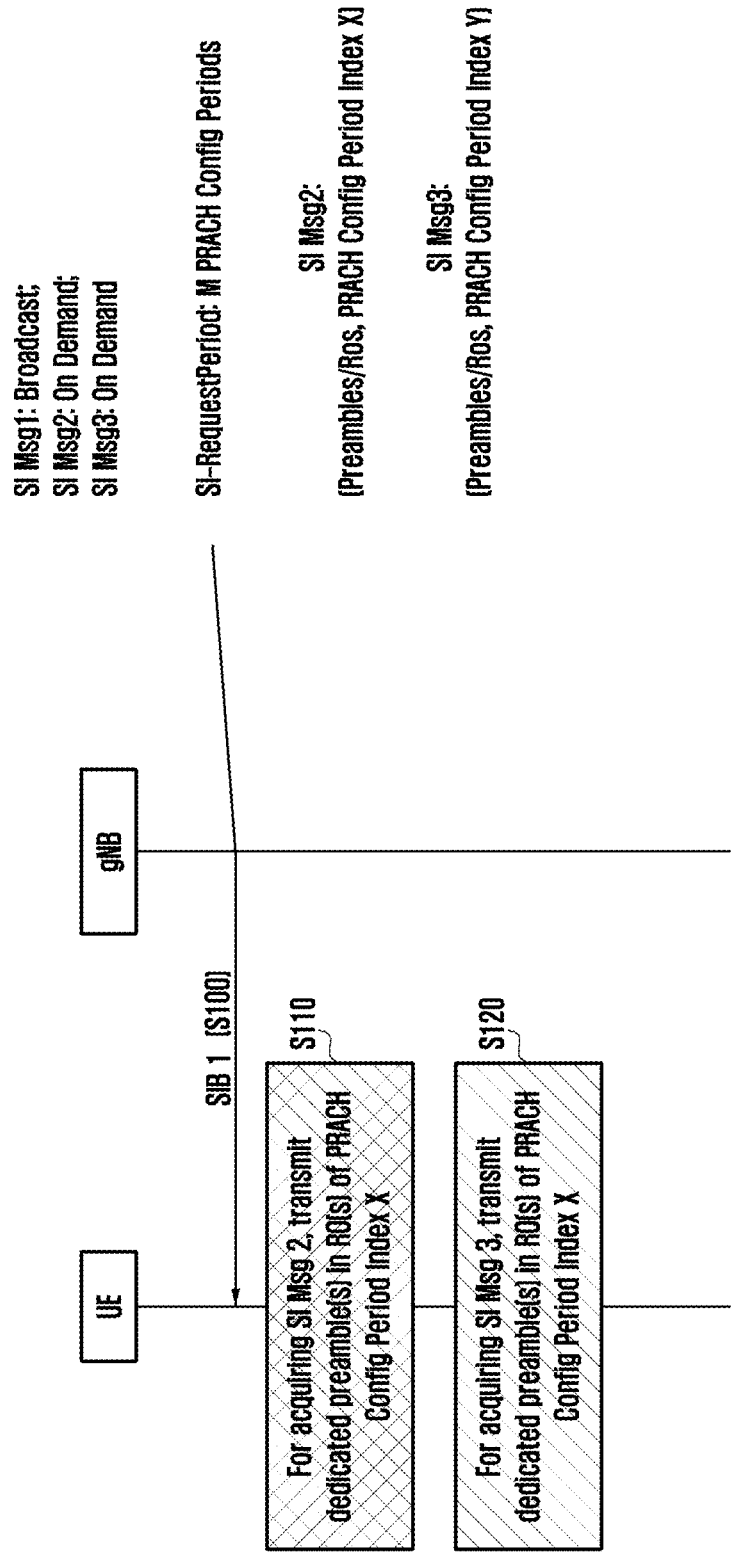
FIGS. 1A and 1B illustrate an operation of PRACH transmission for requesting SI message(s) according to an embodiment of the disclosure.

FIGS. 1A through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions are omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In each drawing, the same or similar components may be denoted by the same reference numerals.

Each block of the flow charts and combinations of the flow charts may be performed by computer program instructions. Because these computer program instructions may be mounted in processors for a general computer, a special computer, or other programmable data processing apparatuses, these instructions executed by the processors for the computer or the other programmable data processing apparatuses create means performing functions described in block(s) of the flow charts. Because these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Because the computer program instructions may also be mounted on the computer or the other programmable data processing apparatuses, the instructions performing a series of operation steps on the computer or the other programmable data processing apparatuses to create processes executed by the computer to thereby execute the computer or the other programmable data processing apparatuses may also provide steps for performing the functions described in block(s) of the flow charts.

In addition, each block may indicate a module, a segment, and/or a code including one or more executable instructions for executing a specific logical function(s). Further, functions mentioned in the blocks occur regardless of a sequence in some alternative embodiments. For example, two blocks that are consecutively illustrated may be simultaneously performed in fact or be performed in a reverse sequence depending on corresponding functions sometimes.

Herein, the term "unit" may include software and/or hardware components, such as a field-programmable gate array (FPGA) and/or an application-specific integrated circuit (ASIC). However, the meaning of "unit" is not limited to software and/or hardware. For example, a unit may be configured to be in a storage medium that may be addressed and may also be configured to reproduce one or more processor. Accordingly, a "unit" may include components such as software components, object oriented software components, class components, task components, processors, functions, attributes, procedures, subroutines, segments of program code, drivers, firmware, microcode, circuit, data, database, data structures, tables, arrays, and variables.

Functions provided in the components and the "units" may be combined with a smaller number of components and/or "units" or may further separated into additional components and/or "units".

In addition, components and units may also be implemented to reproduce one or more CPUs within a device or a security multimedia card.

The terms as used in the disclosure are provided to describe specific embodiments, and do not limit the scope of other embodiments. It is to be understood that singular forms include plural forms unless the context clearly dictates otherwise. Unless otherwise defined, the terms and words including technical or scientific terms used in the following description and claims may have the same meanings as generally understood by those skilled in the art. The terms as generally defined in dictionaries may be interpreted as having the same or similar meanings as the contextual meanings of related technology. Unless otherwise defined, the terms should not be interpreted as ideally or excessively formal meanings. When needed, even the terms as defined in the disclosure may not be interpreted as excluding embodiments of the disclosure.

Herein, a base station performs resource allocation to a terminal. Examples of the base station may include an eNode B, a Node B, a wireless access unit, a base station controller, a node on a network, etc. Examples of the terminal may include a user equipment (UE), a mobile station (MS), a cellular phone, a smart phone, a computer, a multimedia system performing a communication function, etc.

Herein, a downlink (DL) is a radio transmission path of a signal from a base station to a UE and an uplink (UL) is a radio transmission path of a signal from the UE to the base station.

The embodiments of the disclosure may be applied to other communication systems having similar technical backgrounds or channel forms.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only voice service but also data service. In recent years, the fourth wireless communication system has been developed to provide high-speed data service. However, currently, the fourth generation wireless communication system suffers from lack of resources to meet the growing demand for high speed data services. So, fifth generation wireless communication system is being developed to meet the growing demand for high speed data services, support ultra-reliability and low latency applications.

The fifth generation (5G) wireless communication system may be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive multiple-input multiple-output (MIMO), full dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example, use cases the fifth generation wireless communication system wireless system is expected to address is enhanced mobile broadband (eMBB), massive machine type communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the industrial automation application, vehicle-to-vehicle/vehicle-to-infrastructure communication foreseen as one of the enablers for autonomous cars.

In the fourth generation (4G) wireless communication system, an enhanced node B (eNB) or a base station in cell broadcast system information. System information is structured into master information block (MIB) and a set of system information blocks (SIBs). MIB consists of system frame number (SFN), downlink system bandwidth and physical hybrid ARQ feedback indicator channel (PHICH) configuration. MIB is transmitted every 40 ms. The MIB is repeated every 10 ms wherein the first transmission occurs in subframe #0 when SFM mod 4 equals zero. MIB is transmitted on physical broadcast channel. System information block type 1 carries cell indemnity, tracking area code, cell barring information, value tag (common for all scheduling units), and scheduling information of other SIBS. SIB 1 is transmitted every 80 ms in subframe #5 when SFN mod 8 equals zero. SIB 1 is repeated in subframe #5 when SFN mod 2 equals zero. SIB 1 is transmitted on physical downlink shared channel. Other SIBs (SIB 2 to SIB 19) are transmitted in System Information (SI) message wherein scheduling info of these SIBs are indicated in SIB 1.

A UE acquires the system information at cell selection, cell reselection, after handover completion, after entering E-UTRA from another RAT, upon re-entering service area, upon receiving a notification (paging), and upon exceeding the maximum validity duration (3 hr.). In RRC idle and inactive state, a UE needs to acquire MIB, SIB 1, SIB 2 to SIB 5, SIB 6 to SIB 8 (depending on RAT supported), SIB 17 (if LTE-WLAN IWK is supported), and SIB 18 to SIB 19 (if D2D is supported). In RRC connected state, a UE needs to acquire MIB, SIB 1, SIB 2, SIB 8 (depending on RAT supported), SIB 17 (if LTE-WLAN IWK is supported), and SIB 18 to SIB 19 (if D2D is supported).

In the next generation wireless communication system (i.e., 5G), System information (SI) is divided into the MIB and a number of SIBs where: (1) the MIB is always transmitted on the BCH with a periodicity of 80 milliseconds (ms) and repetitions made within 80 ms and the MIB includes parameters that are needed to acquire SIB1 from the cell. The first transmission of the MIB is scheduled in subframes defined by of radio frames for which the SFN mod 8=0, and repetitions are scheduled in other radio frames according to the period of SSB; (2) the SIB1 is transmitted on the DL-SCH with a periodicity of 160 ms and variable transmission repetition periodicity. The default transmission repetition periodicity of SIB1 is 20 ms but the actual transmission repetition periodicity is up to network implementation. For SSB and CORESET multiplexing pattern 1, SIB1 repetition transmission period is 20 ms. For SSB and CORESET multiplexing pattern ⅔, SIB1 transmission repetition period is the same as the SSB period. SIB1 includes information regarding the availability and scheduling (e.g., mapping of SIBs to SI message, periodicity, SI-window size) of other SIBs with an indication whether one or more SIBs are only provided on-demand and, in that case, the configuration needed by the UE to perform the SI request. SIB1 is cell-specific SIB; and (3) SIBs other than SIB1 are carried in system information (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Any SIB except SIB1 can be configured to be cell specific or area specific. The cell specific SIB is applicable only within a cell that provides the SIB while the area specific SIB is applicable within an area referred to as SI area, which consists of one or several cells and is identified by systemInformationAreaID;

In the 5G system, a UE acquires the SI acquisition upon cell selection (e.g., upon power on), cell-reselection, return from out of coverage, after reconfiguration with sync completion, after entering the network from another RAT, upon receiving an indication that the system information has changed, upon receiving a PWS notification; whenever the UE does not have a valid version of a stored SI.

When the UE acquires a MIB or a SIB 1 or a SI message in a currently camped/serving cell, the UE may store the acquired SI. A version of the SI that the UE stored is no longer valid 3 hours after acquisition. The UE may use a valid stored version of the SI except MIB and SIB 1 e.g., after cell re-selection, upon return from out of coverage or after the reception of SI change indication. A stored version of the area specific SIB is valid in a public land mobile network (PLMN) if the systeminformationAreaID and the valueTag that are included in the SIB1 received from the currently camped/serving cell are identical to the PLMN identity, systemInformationAreaID and the valueTag associated with the stored version of that SIB. In the 5G system for the SI message(s) that, according to the si-SchedulingInfo, contain at least one required SIB and for which si-BroadcastStatus is set to broadcasting: (1) if SIB1 includes si-SchedulingInfo containing si-Request-Config for the SI message(s) that the UE requires to operate within the cell: the UE initiate the Random Access procedure using the PRACH preamble (s) and PRACH resource (s) corresponding to the SI message(s) that the UE requires to operate within the cell; (2) if SIB1 includes si-SchedulingInfo without containing si-Request-Config for the SI message(s) that the UE requires to operate within the cell: the UE initiate transmission of the RRCSystemInfoRequest message; and (3) Upon receiving the acknowledgement for SI request, in order to receive the requested SI message(s) the UE monitors SI Window(s) of requested SI message(s).

In the 5G system SI-RequestConfig (if included in si-SchedulingInfo) includes a list si-RequestResources. The size of the list si-RequestResources is either one or equal to number of on demand SI messages in schedulingInfoList. If there is only one entry in the list, the configuration is used for all SI messages which are provided on demand. Otherwise, the 1st entry in the list corresponds to the first on demand SI message in schedulingInfoList, 2nd entry in the list corresponds to the second on demand SI message in schedulingInfoList and so on. The si-RequestResources includes ra-PreambleStartIndex, ra-ConfigurationPeriodIndex and ra-ssb-OccasionMaskIndex.

For SI message(s) corresponding to an entry in the list si-RequestResources, ra-PreambleStartIndex indicates the RACH preambles to be used for requesting these SI message(s). A UE may select a SSB and then a RACH preamble from the RACH preambles indicated by ra-PreambleStartIndex for requesting these SI message(s).

In one example, if N SSBs are associated with a RACH occasion, where N>=1, for the ith SSB (i=0, ..., N−1) the preamble with preamble index=ra-PreambleStartIndex+i is used for SI request; For N<1, the preamble with preamble index=ra-PreambleStartIndex is used for SI request. Parameter N is signaled in system information.

In one example, the RACH preamble selected (as explained above) by a UE for requesting these SI message(s), can be transmitted only in the PRACH configuration period indicated by ra-ConfigurationPeriodIndex. PRACH configuration periods in SI request period are sequentially numbered from zero. ra-ConfigurationPeriodIndex is the index of PRACH configuration period in SI request period. SI request period in multiple of PRACH configuration period is signaled in SI-RequestConfig.

Figure 1B:
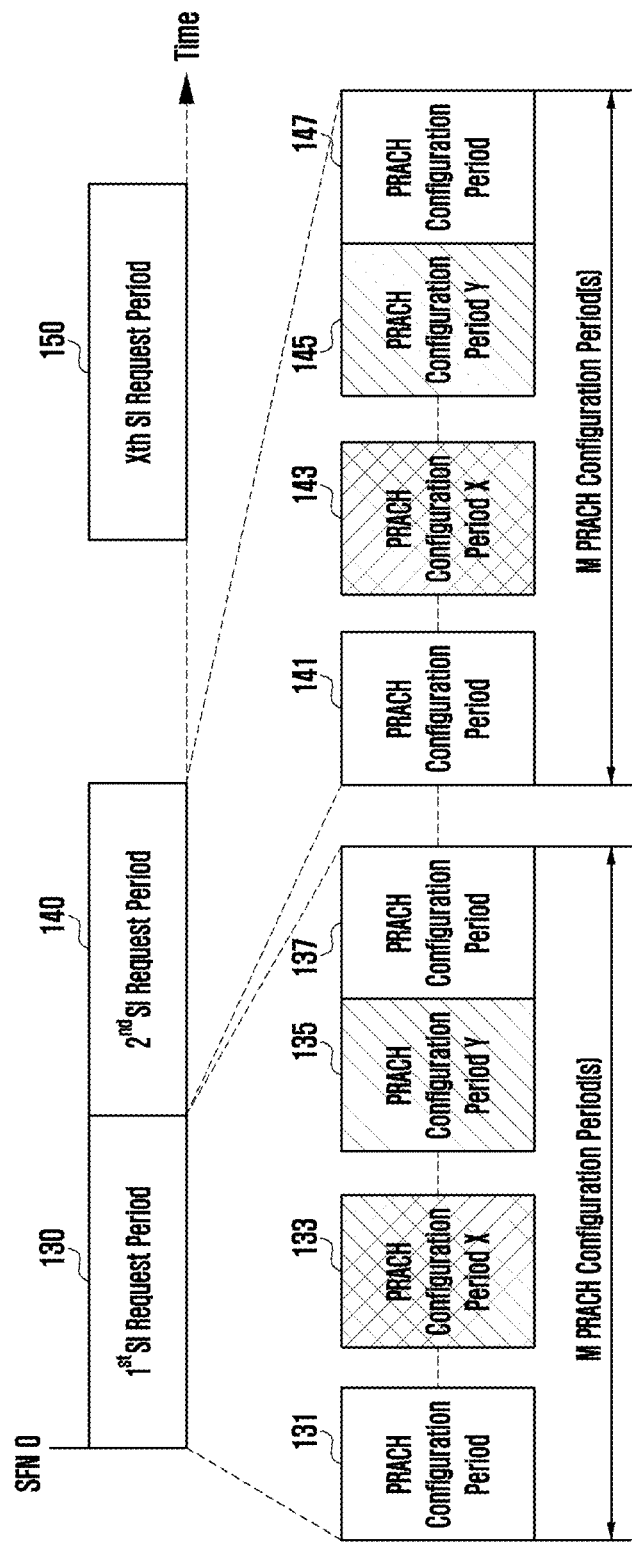

FIGS. 1A and 1B illustrate an operation of PRACH transmission for requesting SI message(s) according to an embodiment of the present disclosure.

Referring to FIGS. 1A and 1B, the first SI request period starts from SFN 0. For example, as shown in FIGS. 1A and 1B, SIB1 indicates in si-SchedulingInfo that SI Msg1: Broadcasted; SI Msg2: provided On Demand; SI Msg3: provided On Demand. SIB 1 also indicates that SI request period is equal to M PRACH configuration periods. SIB1 also indicates that ra-ConfigurationPeriodIndex is X for SI Msg2, ra-ConfigurationPeriodIndex is Y for SI Msg3. So, in this example, for acquiring SI Msg2, a UE may transmit the PRACH preamble selected based on SSB and ra-PreambleStartIndex, in the RACH occasions of PRACH configuration period X in SI request period. The UE may select one of the RACH occasions in PRACH configuration period X in SI request period based on ra-ssb-OccasionMaskIndex. ra-ssb-OccasionMaskIndex indicates which of RACH occasions amongst all the RACH occasions associated with selected SSB, the UE can select in the PRACH configuration period X.

The current 5G design to indicate RACH occasions for requesting SI message(s) is not efficient. The current design works only in the case all the SSBs transmitted by a gNB can be mapped to RACH occasions in a PRACH configuration period. The current design does not work in the scenario when all the SSBs transmitted by a gNB cannot be mapped to RACH occasions in one PRACH configuration period. Depending on the number of SSBs transmitted and number of RACH occasions in a PRACH configuration period, the number of PRACH configuration periods needed for mapping RACH occasions to SSBs varies from 1 to 16 such that each SSB is associated to at least one RACH occasion.

Figure 2A:
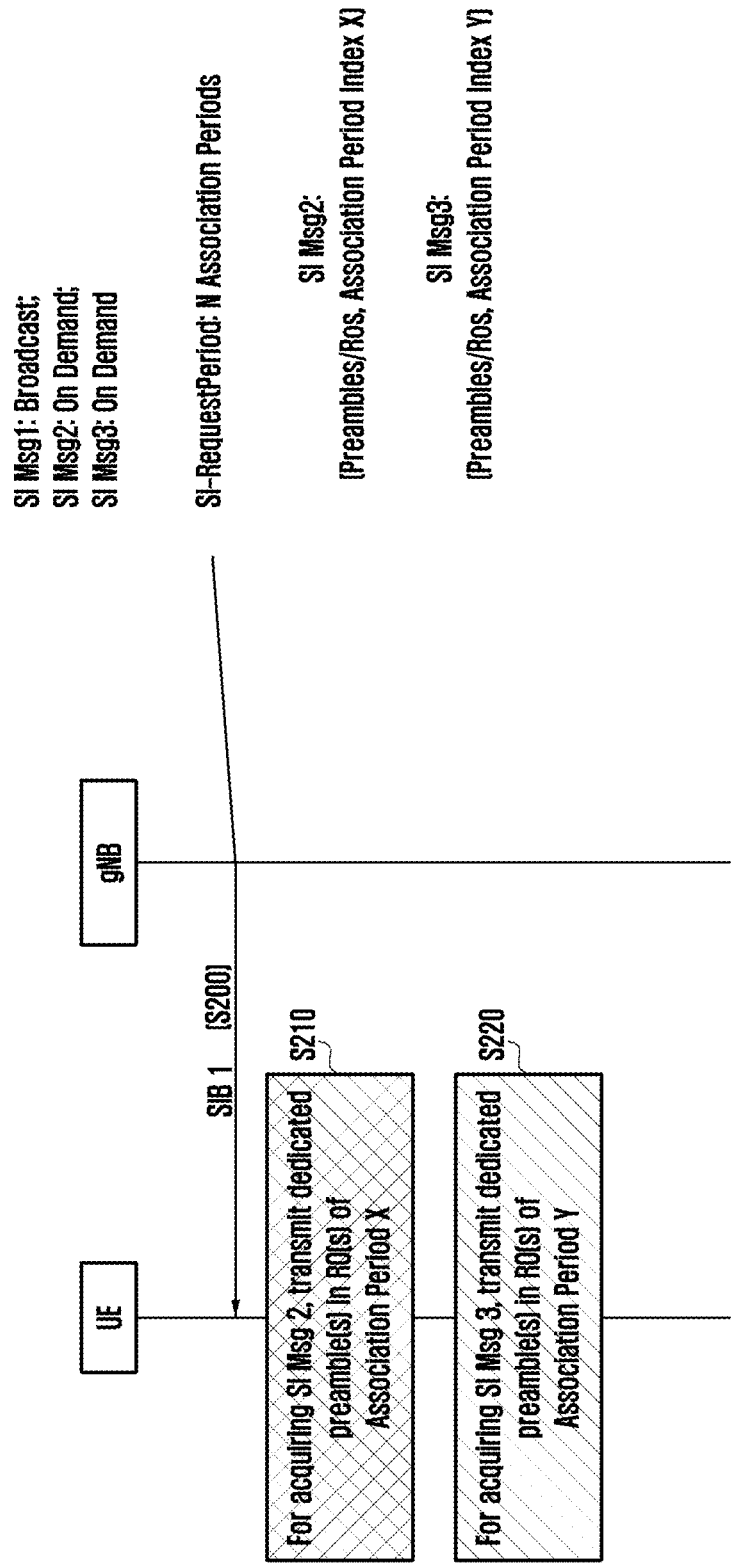
FIGS. 2A and 2B illustrate RACH occasions for requesting SI message according to an embodiment of the disclosure.
Figure 2B:
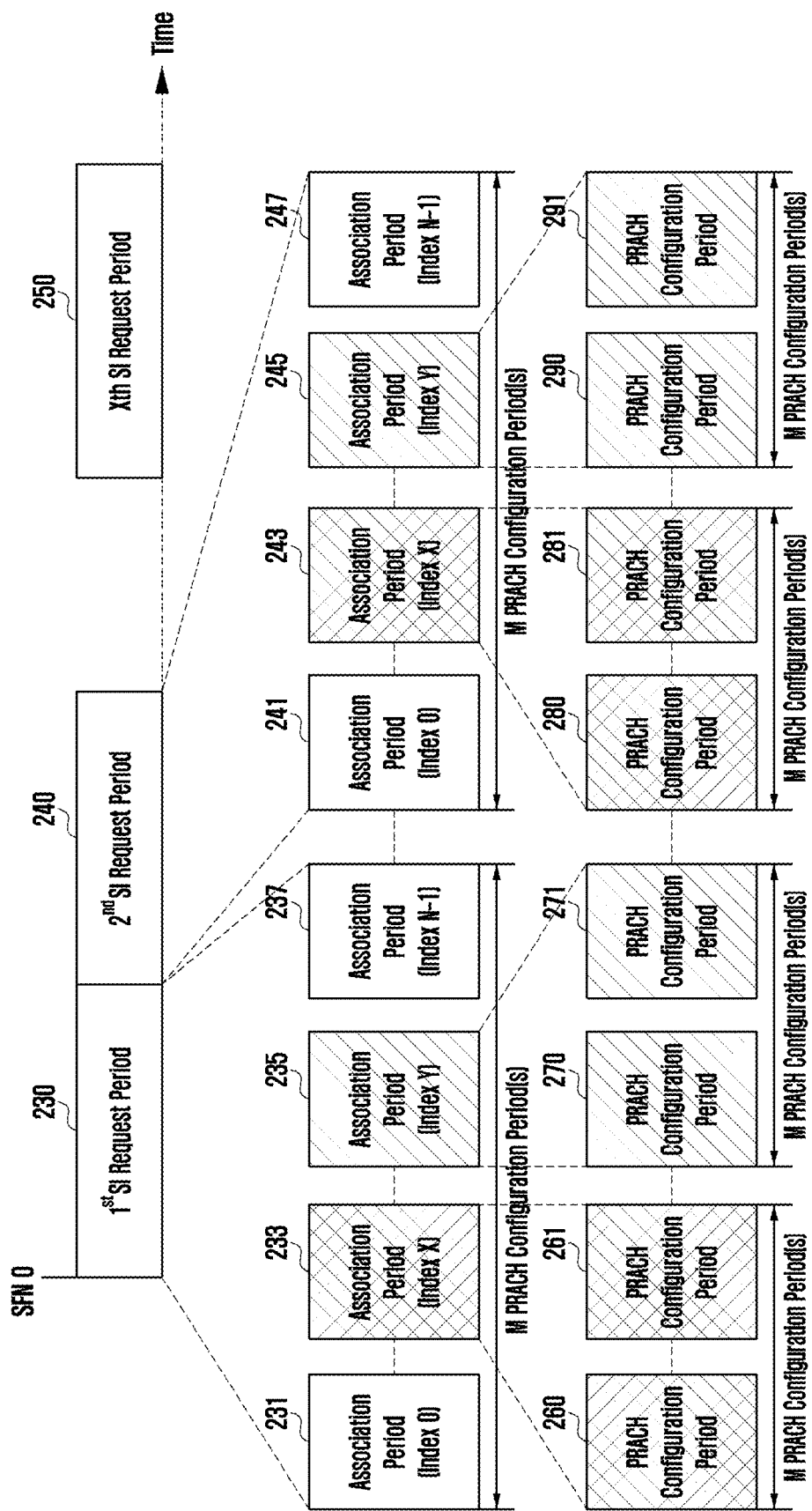

FIGS. 2A and 2B illustrate RACH occasions for requesting SI message according to an embodiment of the disclosure.

Embodiment 1

In one embodiment of the present disclosure, referring to FIGS. 2A and 2B, it may be provided that a SI request period is in multiple of association period. For example, the SI request period can be one, two, four, six, eight, 10, 12, or 16 association periods. The SI request period starts from SFN 0 as shown in FIGS. 2A and 2B. A base station (gNB) signals a SI request period in multiple of association period in SIB1 (e.g., SI-RequestConfig IE in SIB 1 includes this parameter as shown in Table 1A below).

The association period starting from SFN 0 is the period in which all SSBs are mapped to PRACH occasions at least once. In an example, the association period can be equal to {1, 2, 4, 8, 16} PRACH configuration periods.

The number of PRACH configuration periods M in association period is not signaled by a gNB. It is determined by a UE based on a number of SSBs mapped to PRACH occasions, a number of SSBs transmitted in cell, and a number of PRACH occasions in PRACH configuration period. The number of SSBs mapped to a PRACH occasion is signaled by a gNB in system information. The number of SSBs transmitted in cell is also signaled by a gNB in system information and dedicated RRC signaling message. The number of PRACH occasions in PRACH configuration period is pre-defined for each PRACH config index where the PRACH config index is signaled by a gNB in system information. A PRACH configuration period for each PRACH config index is also pre-defined. A pre-defined PRACH configuration table indicate number of PRACH occasions in the PRACH configuration period, the PRACH configuration period, a location of PRACH occasions in the PRACH configuration period. A PRACH config index is an index to an entry in this PRACH configuration table.

SIB 1 also includes a list—i.e., si-RequestResources (e.g., SI-RequestConfig IE in SIB 1 includes this parameter si-RequestResources as shown in Table 1A below). Each entry in this list provides resource configuration for requesting one or more SI messages. Each entry in this list si-RequestResources includes ra-PreambleStartIndex. For SI message(s) corresponding to an entry in the list si-RequestResources, ra-PreambleStartIndex indicates the PRACH preambles to be used for requesting these SI message(s). A UE may select a SSB and then a PRACH preamble corresponding to selected SSB from the PRACH preambles indicated by ra-PreambleStartIndex for requesting these SI message(s).

If N SSBs are associated with a PRACH occasion, where N>=1, for the ith SSB (i=0, ..., N−1) the preamble with preamble index=ra-PreambleStartIndex+i is used for SI request; For N<1, the preamble with preamble index=ra-PreambleStartIndex is used for SI request i.e., PRACH preamble indicated by ra-PreambleStartIndex is applicable for all the SSBs. A parameter N is signaled in system information. Mapping between SSBs and PRACH occasions is based on a pre-defined rule as specified in LTE specification.

In the provided embodiment, each association period in SI request period is sequentially numbered from zero as shown in FIGS. 2A and 2B. A ra-AssociationPeriodIndex is the index of the association period in SI request period. For SI message(s) corresponding to an entry in the list si-RequestResources, ra-AssociationPeriodIndex is signaled as shown in Table 1A below. The RACH preamble selected as explained above in 2) by a UE for requesting these SI message(s), can be transmitted only in the association period indicated by ra-AssociationPeriodIndex of any SI request period. A UE may select the nearest available SI request period. With this approach different association periods in SI request period can be mapped to different SI message(s) or different set of SI message(s), enabling network to reuse the dedicated preambles for different SI message(s) or different set of SI message(s). ra-AssociationPeriodIndex is the index of the association period in the si-RequestPeriod in which the UE can send the SI request for SI message(s) corresponding to the SI-RequestResources in which this ra-AssociationPeriodIndex is included, using the dedicated preambles indicated by ra-PreambleStartIndex and physical random access channel (PRACH) occasions indicated by ra-ssb-OccasionMaskIndex For example, as shown in FIGS. 2A and 2B, SIB1 indicates in si-SchedulingInfo that SI Msg1 is broadcasted (i.e., si-BroadcastStatus is set to broadcasting); SI Msg2 is provided on demand (i.e., si-BroadcastStatus is set to not broadcasting); A SI Msg3 is provided on demand (i.e., si-BroadcastStatus is set to not broadcasting. SIB 1 also indicates that SI request period is equal to N association periods. SIB1 also indicates that ra-AssociationPeriodIndex is X for SI Msg2, ra-AssociationPeriodIndex is Y for SI Msg3. So, in this example, for acquiring SI Msg2, a UE may transmit the PRACH preamble selected based on SSB and ra-PreambleStartIndex as explained in 2, in the PRACH occasions of association period X in SI request period being the available SI request period may be selected by a UE. If ra-ssb-OccasionMaskIndex is configured, a UE may select one of the PRACH occasion corresponding to selected SSB in association period X in SI request period based on ra-ssb-OccasionMaskIndex. If ra-ssb-OccasionMaskIndex is not configured, UE will select one of the PRACH occasion corresponding to selected SSB in association period X in SI request period. ra-ssb-OccasionMaskIndex indicates which of PRACH occasions amongst all the PRACH occasions associated with selected SSB, a UE can select in the association period X.

Figure 3:
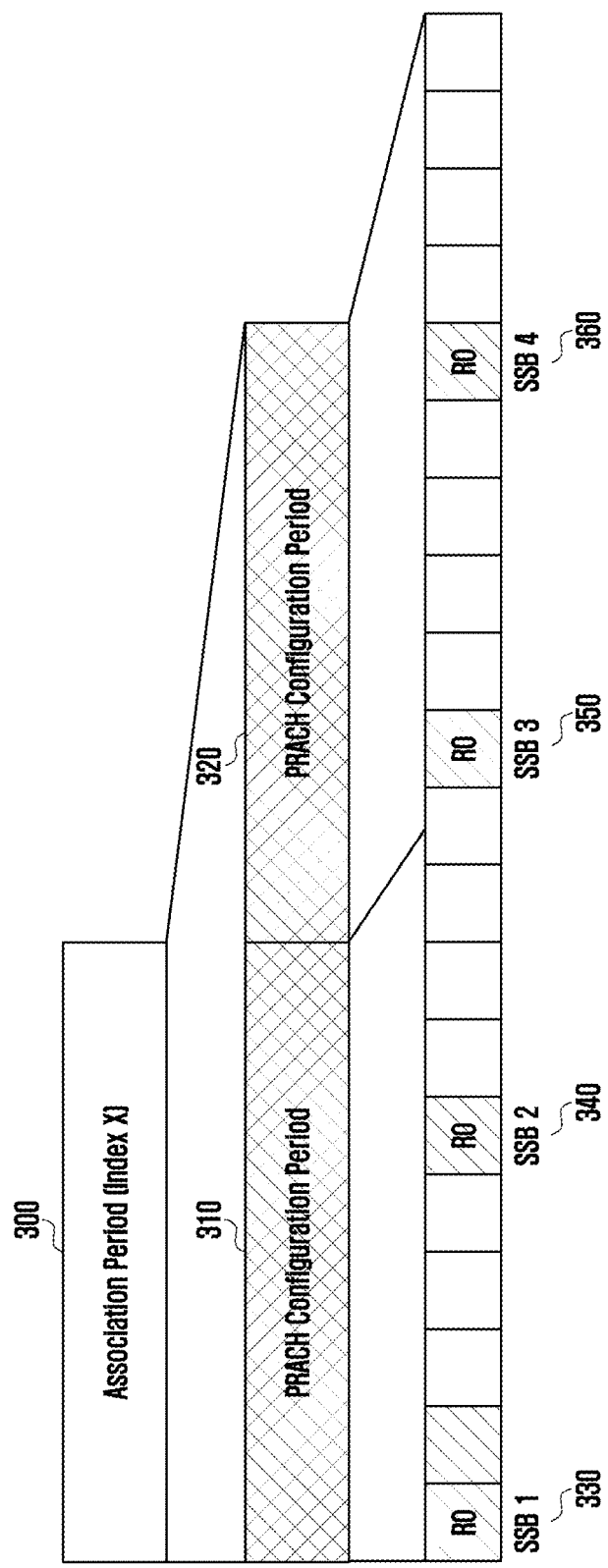
FIG. 3 illustrates RACH occasions associated with SSB according to an embodiment of the disclosure.

FIG. 3 illustrates RACH occasions associated with SSB according to an embodiment of the disclosure.

Referring to FIG. 3, an example is shown in which association period X comprises of two PRACH configuration periods and each PRACH configuration period has two PRACH occasions (ROs). There are 4 SSBs transmitted in cell. If selected SSB is SSB2, a UE may transmit in PRACH occasion corresponding to this SSB in association period X of SI request period.

Figure 4:
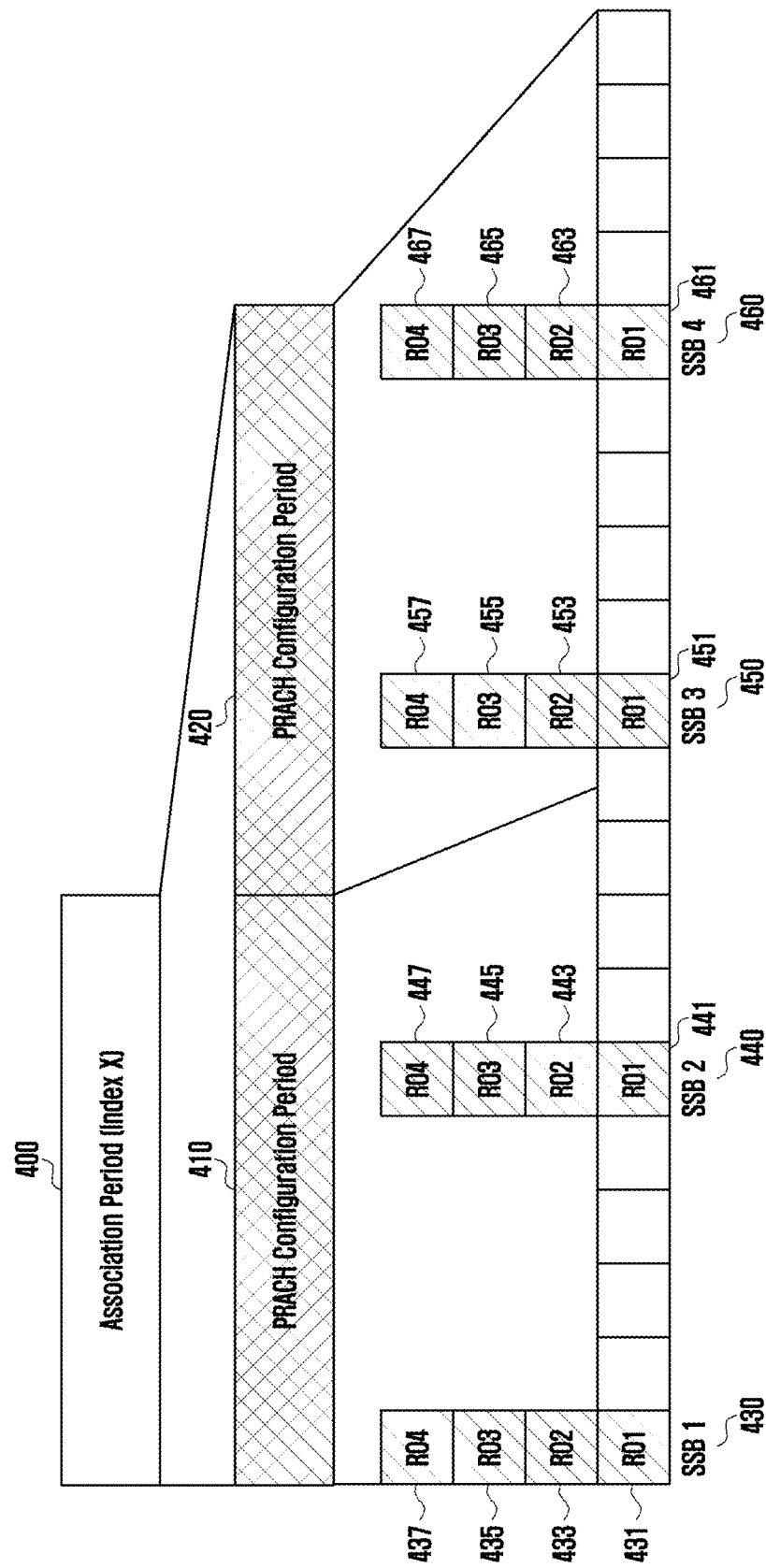
FIG. 4 illustrates RACH occasions associated with SSB according to an embodiment of the disclosure.

FIG. 4 illustrates RACH occasions (ROs) associated with SSB according to an embodiment of the disclosure.

Referring to FIG. 4, an example is shown in which association period X comprises of two PRACH configuration period and each PRACH configuration period has 8 ROs. There are 4 SSBs transmitted in cell. ROs associated with each SSB are numbered from 1 to 4. If selected SSB is SSB2, a UE may transmit in PRACH occasions corresponding to this SSB in association period X of SI request period. Since there are 4 ROs associated with this SSB in association period X, a UE selects one based on ra-ssb-OccasionMaskIndex. If ra-ssb-OccasionMaskIndex indicates odd ROs and selected SSB is 2, a UE may randomly select one from RO 1 and RO 3 for SSB 2. If ra-ssb-OccasionMaskIndex indicates even ROs and selected SSB is 2, the UE may randomly select one from RO 2 and RO 4 for SSB 2. If ra-ssb-OccasionMaskIndex indicates any RO and selected SSB is 2, the UE may randomly select one from RO 1 to RO 4 for SSB 2.

In one embodiment, MAC entity in a UE selects the RACH occasion as follows in TABLE 1B.

TABLE 1A

| SI-SchedulingInfo information element in SIB 1 | |
|---|---|
| SI-SchedulingInfo ::= | SEQUENCE { |
| schedulingInfoList | SEQUENCE (SIZE (1..maxSI-Message)) OF SchedulingInfo, |
| si-RequestConfig MSG-1 | SI-RequestConfig     OPTIONAL, -- Cond |
| si-RequestConfigSUL SUL-MSG-1 | SI-RequestConfig     OPTIONAL, -- Cond |
| } | |
| SchedulingInfo ::= | SEQUENCE { |
| si-BroadcastStatus | ENUMERATED {broadcasting, notBroadcasting}, |
| } | |
| Configuration for Msg1 based SI Request | |
| SI-RequestConfig::= | SEQUENCE { |
| si-RequestPeriod | ENUMERATED {one, two, four, six, eight, ten, twelve, sixteen}, |
| si-RequestResources | SEQUENCE (SIZE (1..maxSI-Message)) OF SI-RequestResources |
| } | |
| SI-RequestResources ::= | SEQUENCE { |
| ra-PreambleStartIndex | INTEGER (0..63), |
| ra-AssociationPeriodIndex | INTEGER (0..15) |
| ra-ssb-OccasionMaskIndex | INTEGER (0..15) |
| } | |

TABLE 1B

RACH occasion selection by MAC entity

- if the random access procedure was initiated for a SI request; and
- if ra-AssociationPeriodIndex and si-RequestPeriod are configured:
- determine the next available PRACH occasion from the PRACH occasions corresponding to the selected SSB in the association period given by ra-AssociationPeriodIndex in the si-RequestPeriod permitted by the restrictions given by the ra-ssb-OccasionMaskIndex if configured (the MAC entity may select a PRACH occasion randomly with equal probability amongst the consecutive PRACH occasions according to LTE specification corresponding to the selected SSB).

Embodiment 2

Figure 5A:
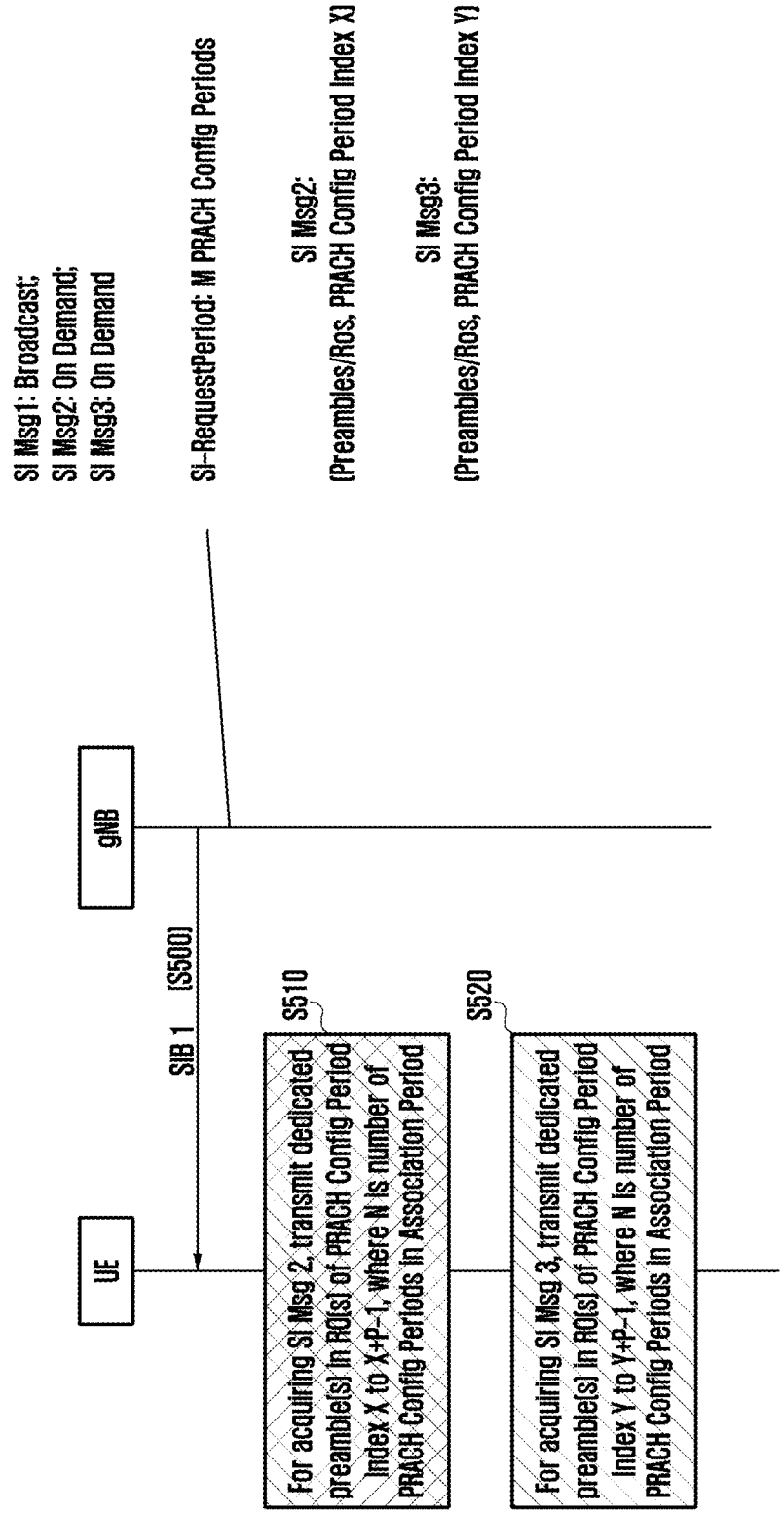
FIGS. 5A and 5B illustrates RACH occasions for requesting SI message according to an embodiment of the disclosure.
Figure 5B:
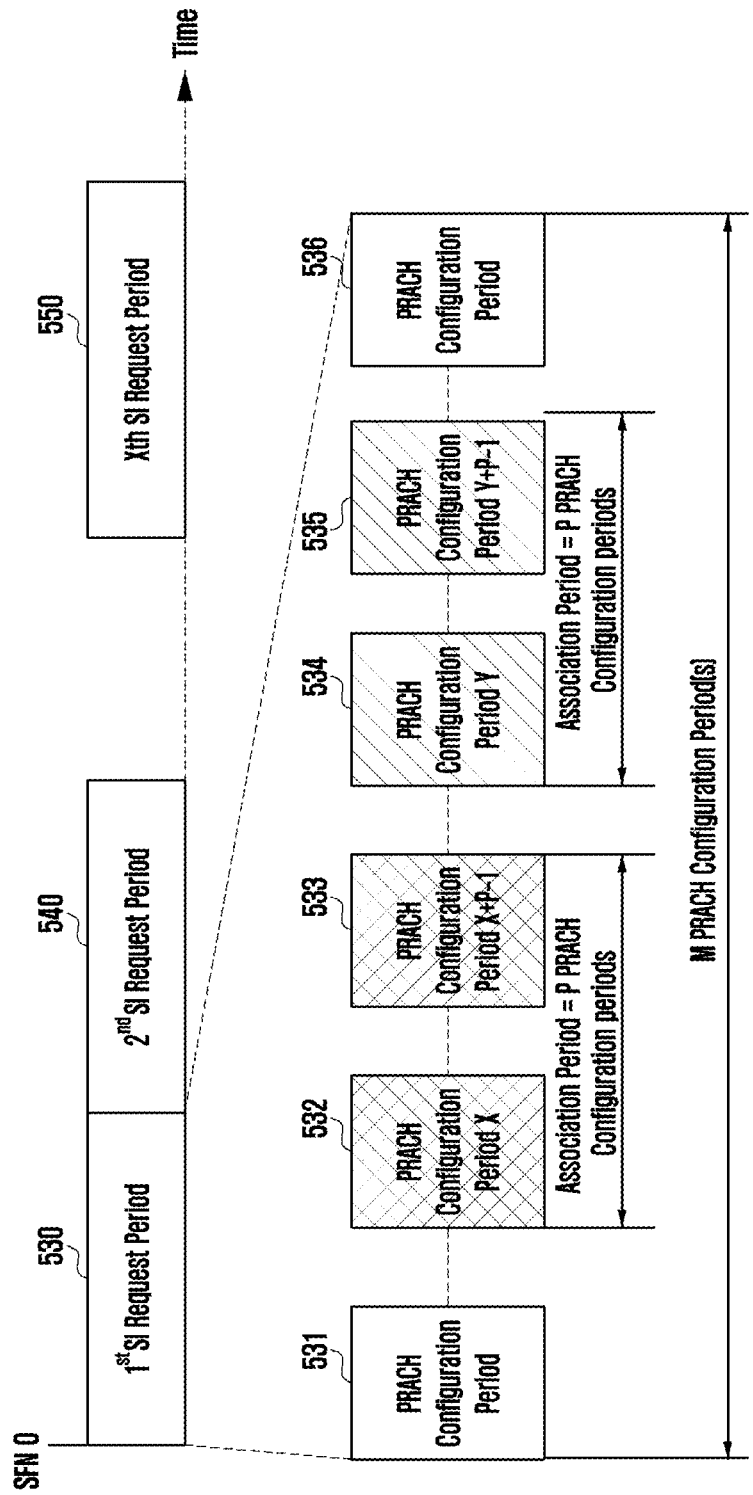

FIGS. 5A and 5B illustrate RACH occasions for requesting SI message according to an embodiment of the disclosure.

In one embodiment, it may be provided that a SI request period is in multiples of the PRACH configuration period. For example, the SI request period can be one, two, four, six, eight, 10, 12, or 16 or 32 PRACH configuration periods. The number of PRACH configuration periods in a SI request period may be multiple of association period. The SI request period starts from SFN 0 as shown in FIGS. 5A and 5B. A gNB signals a SI request period in multiple of PRACH configuration period in SIB1 (e.g., SI-RequestConfig IE in SIB 1 includes this parameter as shown in Table 2A below).

SIB 1 also includes a list i.e., si-RequestResources (e.g., SI-RequestConfig aE in SIB 1 includes this parameter si-RequestResources as shown in Table 2A below). Each entry in this list provides resource configuration for requesting one or more SI messages. Each entry in this list si-RequestResources includes ra-PreambleStartIndex. For SI message(s) corresponding to an entry in the list si-RequestResources, ra-PreambleStartIndex indicates the RACH preambles to be used for requesting these SI message(s). A UE may select a SSB and then a PRACH preamble from the RACH preambles indicated by ra-PreambleStartIndex for requesting these SI message(s).

If N SSBs are associated with a RACH occasion, where N>=1, for the ith SSB (i=0, . . . , N−1) the preamble with preamble index=ra-PreambleStartIndex+i is used for SI request; For N<1, the preamble with preamble index=ra-PreambleStartIndex is used for SI request. A parameter N is signaled in system information. Mapping between SSBs and RACH occasions is based on a pre-defined rule as specified in LTE specification.

In the present disclosure, each PRACH configuration period in SI request period is sequentially numbered from zero as shown in FIGS. 5A and 5B. ra-ConfigurationPeriodIndex is the index of the PRACH configuration period in SI request period. For SI message(s) corresponding to an entry in the list si-RequestResources, ra-ConfigurationPeriodIndex is signaled as shown in Table 2A below. The RACH preamble selected as explained above in 2 by a UE for requesting these SI message(s), can be transmitted only in the PRACH configuration periods indicated by ra-ConfigurationPeriodIndex to "ra-ConfigurationPeriodIndex+X−1" of any SI Request period where X is number of PRACH configuration periods in an association period. A UE may select the nearest available SI request period. The association period is the period in which all SSBs are mapped to RACH Occasions at least once. In an example, the association period can be equal to {1, 2, 4, 8, 16} PRACH Configuration periods. The number of PRACH configuration periods in association period is not signaled by a gNB.

The number of PRACH configuration periods is determined by a UE based on a number of SSBs mapped to a RACH occasion, a number of SSBs transmitted in cell, and a number of PRACH occasions in PRACH configuration period. The number of SSBs mapped to a PRACH occasion is signaled by a gNB in system information. The number of SSBs transmitted in a cell is also signaled by a gNB in system information and dedicated RRC signaling message. The number of PRACH occasions in a PRACH configuration period is pre-defined for each PRACH config index where the PRACH config index is signaled by a gNB in system information. A PRACH configuration period for each PRACH config index is also pre-defined. A pre-defined PRACH configuration table indicate a number of PRACH occasions in a PRACH configuration period, a PRACH configuration period, a location of PRACH occasions in a PRACH configuration period. A PRACH config index is an index to an entry in this PRACH configuration table. A UE can send the SI request for SI message(s) corresponding to the SI-RequestResources in which this ra-ConfigurationPeriodIndex is included, using the dedicated preambles indicated by ra-PreambleStartIndex and RACH occasions indicated by ra-ssb-OccasionMaskIndex For example, as shown in FIGS. 5A and 5B, SIB1 indicates in si-SchedulingInfo that SI Msg1 is broadcasted (i.e., si-BroadcastStatus is set to broadcasting); A SI Msg2 is provided on demand (i.e., si-BroadcastStatus is set to not broadcasting); A SI Msg3 is provided on demand (i.e., si-BroadcastStatus is set to not broadcasting. SIB 1 also indicates that SI request period is equal to M PRACH Configuration periods. SIB1 also indicates that ra-ConfigurationPeriodIndex is X for SI Msg2, ra-ConfigurationPeriodIndex is Y for a SI Msg3. So in this example, for acquiring a SI Msg2, a UE may transmit the PRACH preamble selected based on SSB and ra-PreambleStartIndex as explained in embodiment 2, in the PRACH occasions of ra-ConfigurationPeriodIndex X to ra-ConfigurationPeriodIndex X+P−1 in SI request period being the nearest available SI request period selected by the UE, where P is a number of PRACH configuration periods in ra-ConfigurationPeriodIndex X to ra-ConfigurationPeriodIndex X+P−1. If ra-ssb-OccasionMaskIndex is configured, a UE may select one of the PRACH occasion corresponding to selected SSB in ra-ConfigurationPeriodIndex X to ra-ConfigurationPeriodIndex X+P−1 in SI request period based on ra-ssb-OccasionMaskIndex. If ra-ssb-OccasionMaskIndex is not configured, UE will select one of the PRACH occasion corresponding to selected SSB in ra-ConfigurationPeriodIndex X to ra-ConfigurationPeriodIndex X+P−1 in SI request period. ra-ssb-OccasionMaskIndex indicates which of the PRACH occasions amongst all the PRACH occasions associated with selected SSB, the UE can select in the ra-ConfigurationPeriodIndex X to ra-ConfigurationPeriodIndex X+P−1.

Figure 6:
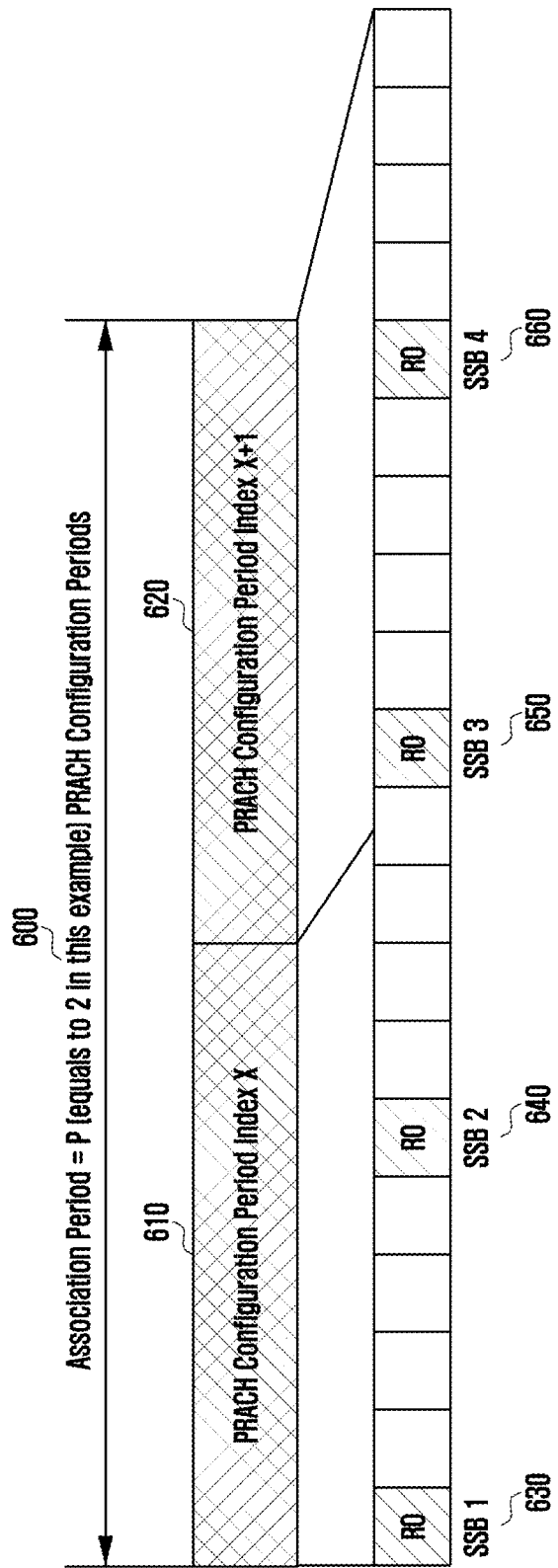
FIG. 6 illustrates RACH occasions associated with SSB according to an embodiment of the disclosure.

FIG. 6 illustrates RACH occasions associated with SSB according to an embodiment of the disclosure.

Referring to FIG. 6, an example is shown in which association period comprises of two PRACH configuration periods and each PRACH configuration period has two ROs. There are 4 SSBs transmitted in cell. If selected SSB is SSB2, a UE may transmit in PRACH occasion corresponding to this SSB in association period (i.e., PRACH configuration period X and X+1) of SI request period.

Figure 7:
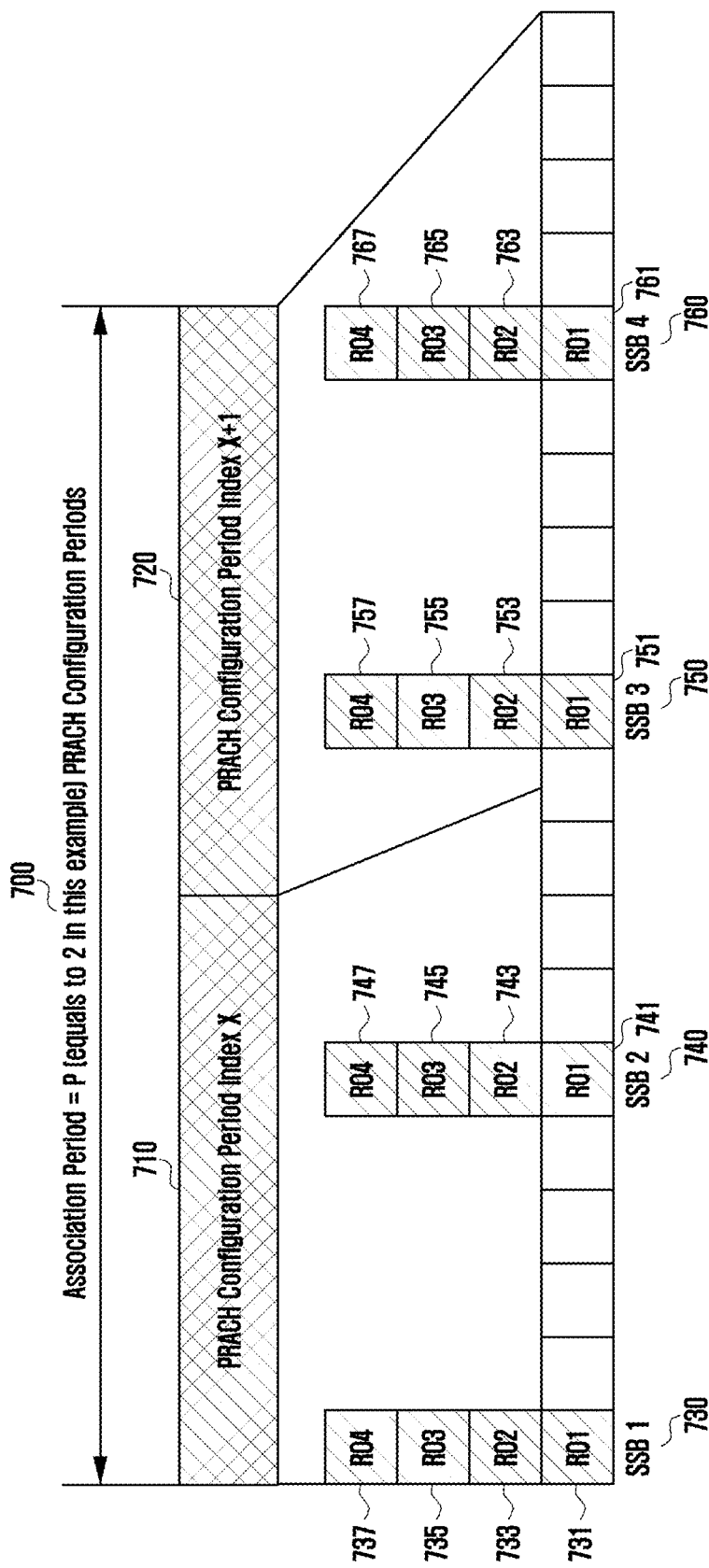
FIG. 7 illustrates RACH occasions associated with SSB according to an embodiment of the disclosure.

FIG. 7 illustrates RACH occasions associated with SSB according to an embodiment of the disclosure.

Referring to FIG. 7, an example is shown in which association period comprises of two PRACH configuration periods and each PRACH configuration period has 8 ROs.

There are 4 SSBs transmitted in a cell. ROs associated with each SSB are numbered from 1 to 4. If selected SSB is SSB2, a UE may transmit in PRACH occasions corresponding to this SSB in association period (i.e., PRACH configuration period X and X+1) of SI request period. Since there are 4 ROs associated with this SSB in association period X, a UE selects one based on ra-ssb-OccasionMaskIndex. If ra-ssb-OccasionMaskIndex indicates odd ROs and selected SSB is 2, a UE may randomly select one from RO 1 and RO 3 for SSB 2. If ra-ssb-OccasionMaskIndex indicates even ROs and selected SSB is 2, a UE may randomly select one from RO 2 and RO 4 for SSB 2. If ra-ssb-OccasionMaskIndex indicates any RO and selected SSB is 2, a UE may randomly select one from RO 1 to RO 4 for SSB 2.

TABLE 2A

SI-SchedulingInfo information element in SIB 1

```
SI-SchedulingInfo ::=        SEQUENCE {
schedulingInfoList           SEQUENCE (SIZE (1..maxSI-Message)) Of SchedulingInfo,
si-RequestConfig             SI-RequestConfig       OPTIONAL, -- Cond
MSG-1
si-RequestConfigSUL          SI-RequestConfig       OPTIONAL, -- Cond
SUL-MSG-1
}
SchedulingInfo ::=           SEQUENCE {
si-BroadcastStatus           ENUMERATED {broadcasting, notBroadcasting},
}
Configuration for Msg1 based SI Request
SI-RequestConfig::=          SEQUENCE {
si-RequestPeriod     ENUMERATED {one, two, four, six, eight, ten, twelve, sixteen},
si-RequestResources SEQUENCE (SIZE (1..maxSI-Message)) OF SI-RequestResources
}
SI-RequestResources ::=      SEQUENCE {
ra-PreambleStartIndex        INTEGER (0..63),
ra-ConfigurationPeriodIndex      INTEGER (0..15)
ra-ssb-OccasionMaskIndex     INTEGER (0..15)
}
```

In one embodiment, a MAC entity in a UE selects the RACH occasion as follows in Table 2B.

TABLE 2B

The RACH occasions selection by a MAC entity

- if the Random Access procedure was initiated for SI request; and
- if ra-ConfigurationPeriodIndex and si-RequestPeriod is configured:
- determine the next available PRACH occasion from the PRACH occasions corresponding to the selected SSB in the association period starting at the PRACH configuration period given by ra-ConfigurationPeriodIndex in the si-RequestPeriod permitted by the restrictions given by the ra-ssb-OccasionMaskIndex (the MAC entity may select a PRACH occasion randomly with equal probability amongst the consecutive PRACH occasions according to LTE specification corresponding to the selected SSB).

Alternately in this embodiment, a MAC entity in a UE selects the RACH occasion as follows in Table 2C.

TABLE 2C

The RACH occasions selection by MAC entity

- if the Random Access procedure was initiated for SI request; and
- if ra-ConfigurationPeriodIndex and si-RequestPeriod is configured:
- determine the next available PRACH occasion from the PRACH occasions corresponding to the selected SSB in the PRACH configuration periods ra-ConfigurationPeriodIndex to ra-ConfigurationPeriodIndex + P −1 in the si-RequestPeriod permitted by the restrictions given by the ra-ssb-OccasionMaskIndex (the MAC entity may select a PRACH occasion randomly with equal probability amongst the consecutive PRACH occasions according to LTE specification corresponding to the selected SSB), where P is the number of PRACH configuration periods in an association period.

In another embodiment of the present disclosure is associated with description of list si-RequestResources In the current design, the size of the list si-RequestResources is either one or equal to a number of SI messages in schedulingInfoList for which si-BroadcastStatus is set to "not broadcasting." 1st entry in the list corresponds to the first on demand (i.e., BroadcastStatus set to 'not broadcasting') SI message in schedulingInfoList, 2nd entry in the list corresponds to the second on demand SI message in schedulingInfoList and so on. Network can change the BroadcastStatus bit without SI update notification. The update to BroadcastStatus bit may lead to different interpretation of si-RequestResources by different UEs. Some examples are shown in Table 2D.

TABLE 2D

| BroadcastStatus bit |
| --- |
| si-RequestResources list size is 2<br>BroadcastStatus bit in Modification period X:<br>SI-Msg1: BroadcastStatus - Broadcasting<br>SI-Msg2: BroadcastStatus – not Broadcasting<br>SI-Msg3: BroadcastStatus – not Broadcasting<br>BroadcastStatus bit in Modification period X+1:<br>SI-Msg1: BroadcastStatus - Broadcasting<br>SI-Msg2: BroadcastStatus – Broadcasting<br>SI-Msg3: BroadcastStatus – not Broadcasting |

A UE which initiates SI request in the modification period X+1 may use SI request resources corresponding to 1st entry in si-RequestResources for SI-Msg3. Whereas a UE which initiates SI request in modification period X may use SI request resources corresponding to 2nd entry in si-RequestResources for a SI-Msg3. The SI request initiated by a UE in a modification period X can continue in modification period X+1 leading to usage of different resources for the same SI request. Similarly for the same SI message different UEs may use different SI request resources from si-RequestResources.

It may be provided that the size of the list si-RequestResources is either one or equal to a number of SI messages in schedulingInfoList. Each entry in the list is optional as shown table 3A below, so that if the network does not support SI request for a particular SI message, then the UE can skip SI request configuration for that SI message. If there is only one entry in the list, the configuration is used for all SI messages which are provided on demand. Otherwise, the 1st entry in the list corresponds to the first SI message in schedulingInfoList, 2nd entry in the list corresponds to the second SI message in schedulingInfoList and so on.

TABLE 3A

| si-RequestResources   SEQUENCE (SIZE (1..maxSI-Message)) OF SI-RequestResources<br>SI-RequestResources ::=     SEQUENCE {<br>siRequestResource SEQUENCE {<br>//parameters<br>} OPTIONAL,<br>} |
| --- |

In an alternate embodiment, it may be provided that a UE acquires the SIB1 if there is change in modification boundary (e.g., a RA procedure was initiated in a modification period X and a RA procedure is ongoing in modification period X+1, a UE reacquires SIB1 in modification period X+1) while the random access procedure initiated for SI request is ongoing. If a random access procedure is initiated for a Msg1 based SI request and if the si-RequestResources in re-acquired SIB1 is updated or not included, a UE may terminate the ongoing random access procedure. If BroadcastStatus bit in re-acquired SIB1 is set to broadcasting for a SI message for which random access procedure is ongoing, a UE may terminate the ongoing random access procedure and acquire the SI message by monitoring the SI window(s) of that SI message.

In another embodiment of the present disclosure is associated with a PO identification for default association (i.e., based on PDCCH monitoring occasions for RMSI).

A UE acquires the system information and receives the paging configuration. If parameter Ns equals to one in paging configuration transmitted in system information and paging search space is not configured (i.e., default association is used), a UE determines the PO as follows in Table 3B.

TABLE 3B

Determination of PO

- if RMSI (or SIB 1) multiplexing pattern is 2 or 3 and SSB periodicity is 5ms, PO is the set of PDCCH monitoring occasions for RMSI in 1st half frame of paging frame (PF) determined by a UE. In other words, PO is 1st half frame of radio frame. The UE obtains the RMSI (or SIB 1) multiplexing pattern index and SSB periodicity from system information.
- if RMSI (or SIB 1) multiplexing pattern is 2 or 3 and SSB periodicity is other than 5ms, PO is the set of PDCCH monitoring occasions for RMSI in the paging frame (PF) determined by a UE. A UE obtains the RMSI (or SIB 1) multiplexing pattern index and SSB periodicity from system information.
- if RMSI (or SIB 1) multiplexing pattern is 1, PO is the set of PDCCH monitoring occasions for RMSI where the set of RMSI occasions starts in PF and last RMSI occasion of that set may be in PF or in PF+1 as determined by RMSI monitoring occasion configuration. A UE obtains the RMSI (or SIB 1) multiplexing pattern index and SSB periodicity from system information.

In another embodiment of the present disclosure is associated with random access procedure enhancements.

In the existing 5G system design, during the random access procedure, upon transmitting the contention based random access preamble, a UE waits for RAR during the RAR window. If the UE receives a PDCCH addressed to RA-RNTI corresponding to transmitted random access preamble and transport block (TB) is successfully decoded and the TB includes RAR carrying the RAPID of transmitted random access preamble, RAR is considered as successfully received. The UE then transmits Msg3 in the UL grant received in RAR and starts contention resolution timer. If the UE has included C-RNTI MAC CE in the Msg3 and the UE receives PDCCH addressed to C-RNTI while the contention resolution timer is running, contention resolution is successful and random access procedure is completed. If the UE has not included C-RNTI MAC CE in the Msg3 and the UE receives MAC PDU including first 48 bits of CCCH SDU included in Msg3 RNTI while the contention resolution timer is running, contention resolution is successful and random access procedure is completed. In the existing 5G system design, during the random access procedure, upon transmitting the contention free random access preamble, the UE waits for RAR during the RAR window. If the UE receives a PDCCH addressed to RA-RNTI corresponding to transmitted random access preamble and TB is successfully decoded and the TB includes RAR carrying the RAPID of transmitted random access preamble, RAR is considered as successfully received and random access procedure is completed.

The current procedure is inefficient for RRC connected UE. The procedure can be further enhanced by monitoring PDCCH addressed to C-RNTI in addition to RA-RNTI after transmitting the random access preamble. This can reduce the latency and would avoid unnecessary transmissions after PDCCH addressed to C-RNTI indicating a new UL transmission is received.

Figure 8:
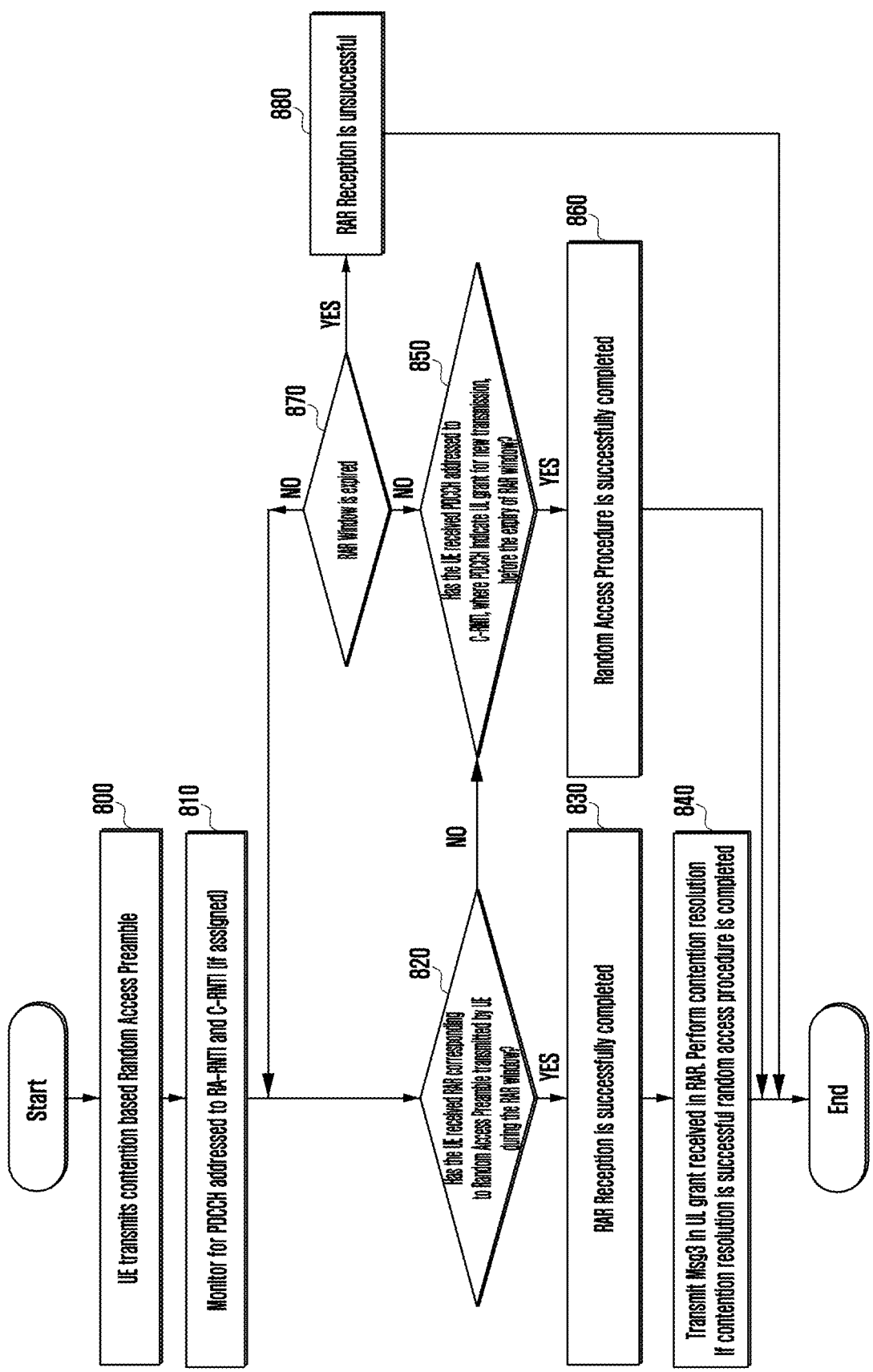
FIG. 8 illustrates a UE operation of a random access procedure according to an embodiment of the disclosure.

FIG. 8 illustrates a UE operation of a random access procedure according to an embodiment of the disclosure.

In one embodiment of the present disclosure, the enhanced procedure is illustrated in FIG. 8.

Referring to FIG. 8, a UE transmits the contention based random access preamble in step 800.

In step 810, the UE monitor for PDCCH addressed to both RA-RNTI and C-RNTI (if assigned) after transmitting the contention based random access preamble in operation 800.

In step 820, the UE identifies whether that the UE has received RAR corresponding to random access preamble transmitted by the UE during the RAR window.

In step 830, the UE identifies that RAR is considered as successfully received in case that the UE has received RAR corresponding to random access preamble transmitted by the UE during the RAR window in step 820.

In step 840, the UE transmits Msg3 in UL grant received in RAR and perform contention resolution. If the contention resolution is successful, random access procedure is completed.

For example, until the RAR window is expired, if the UE receives a PDCCH addressed to RA-RNTI corresponding to transmitted random access preamble and TB is successfully decoded and the TB includes RAR carrying the RAPID of transmitted random access preamble, RAR is considered as successfully received. The UE transmits Msg3 in UL grant received in RAR and perform contention resolution. If the contention resolution is successful, random access procedure is completed.

In step 850, the UE identifies whether that the UE has received a PDCCH addressed to C-RNTI, where received PDCCH indicates UL grant for new transmission, before the expiry of RAR window, in case that the UE has not received RAR corresponding to random access preamble transmitted by the UE during the RAR window in step 820.

In step 860, the UE identifies that the random access procedure is considered successfully completed in case that the UE has received a PDCCH addressed to C-RNTI, where received PDCCH indicates UL grant for new transmission, before the expiry of RAR window in step 850.

For example, the PDCCH addressed to C-RNTI is monitored if the UE has a valid C-RNTI. Until the RAR window is expired, if the UE receives a PDCCH addressed to C-RNTI, where received PDCCH indicates UL grant for new transmission, random access procedure is considered completed.

In step 870, the UE identifies whether that RAR window is expired in case that the UE has not received a PDCCH addressed to C-RNTI, where received PDCCH indicates UL grant for new transmission, before the expiry of RAR window in step 850.

In step 880, the UE identifies that the RAR reception is considered unsuccessful in case that that RAR window is expired in step 870.

The UE step goes to the step 820 in case that RAR window is not expired in step 870.

Figure 9:
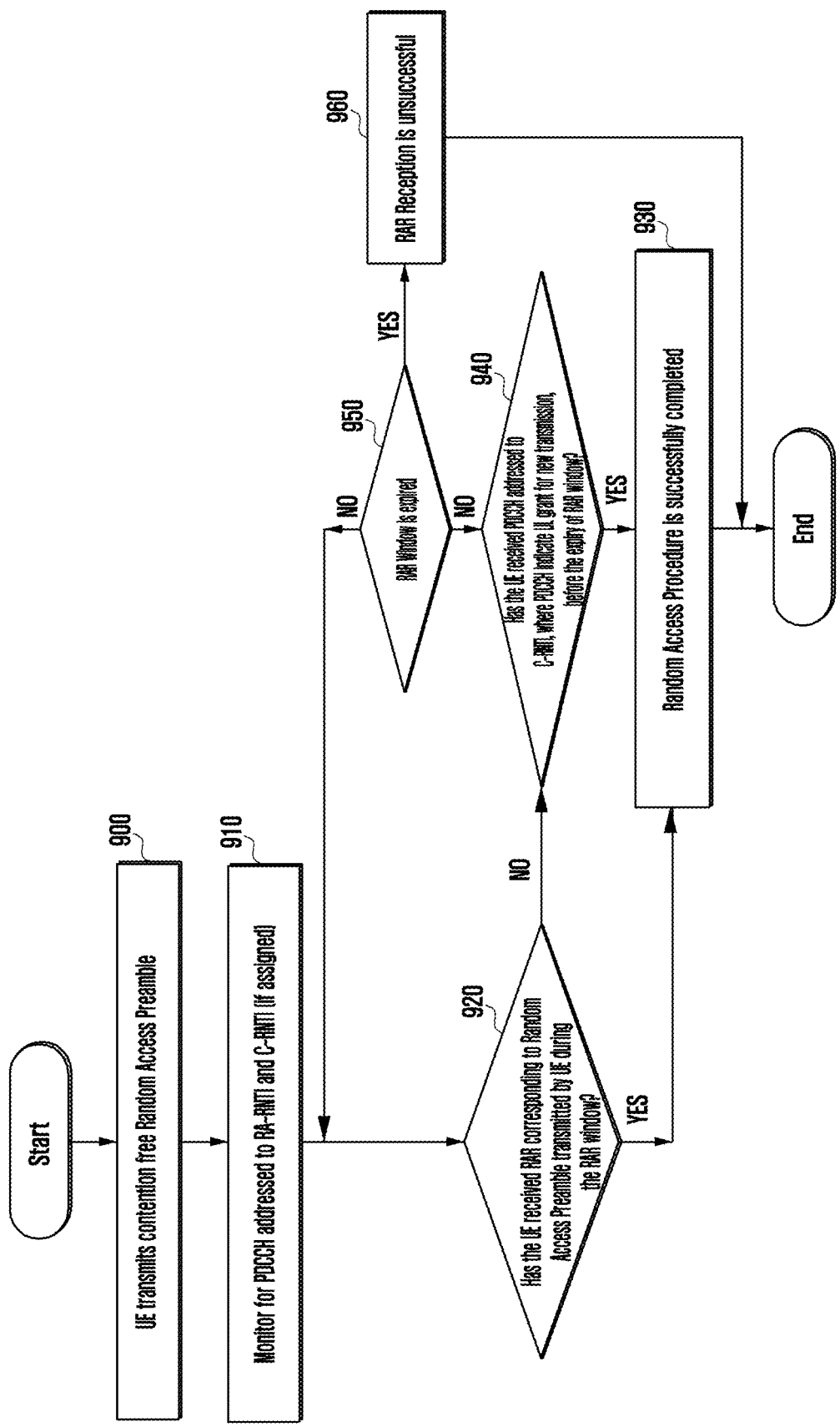
FIG. 9 illustrates a UE operation of a random access procedure according to an embodiment of the disclosure.

FIG. 9 illustrates a UE operation of a random access procedure according to an embodiment of the disclosure.

In one embodiment of the present disclosure, the enhanced procedure is illustrated in FIG. 9.

Referring to FIG. 9, a UE transmits the contention free random access preamble in step 900.

In step 910, the UE monitors for PDCCH addressed to both RA-RNTI and C-RNTI (if assigned) after transmitting the contention free random access preamble in step 900.

In step 920, the UE identifies whether that the UE has received RAR corresponding to random access preamble transmitted by the UE during the RAR window.

In step 930, the UE identifies that random access procedure is considered successfully completed in case that the UE has received RAR corresponding to random access preamble transmitted by the UE during the random access response (RAR) window in step 920.

Until the RAR window is expired, if the UE receives a PDCCH addressed to RA-RNTI corresponding to transmitted random access preamble and TB is successfully decoded and the TB includes RAR carrying the RAPID of transmitted random access preamble, RAR is considered as successfully received and random access procedure is completed.

In step 940, the UE identifies whether that the UE has received a PDCCH addressed to C-RNTI, where received PDCCH indicates UL grant for new transmission, before the expiry of RAR window, in case that the UE has not received RAR corresponding to random access preamble transmitted by the UE during the RAR window in step 920.

The UE operation goes to the step 930 in case that the UE has received a PDCCH addressed to C-RNTI, where received PDCCH indicates UL grant for new transmission, before the expiry of RAR window in step 940.

For example, the PDCCH addressed to C-RNTI is monitored if the UE has a valid C-RNTI. Until the RAR window is expired, if the UE receives a PDCCH addressed to C-RNTI, where received PDCCH indicates UL grant for new transmission, random access procedure is considered completed.

In step 950, the UE identifies whether that RAR window is expired in case that the UE has not received a PDCCH addressed to C-RNTI, where received PDCCH indicates UL grant for new transmission, before the expiry of RAR window in step 940.

In step 960, the UE identifies that the RAR reception is considered unsuccessful in case that that RAR window is expired in step 950.

The UE operation goes to the step 920 in case that RAR window is not expired in step 950.

Figure 10:
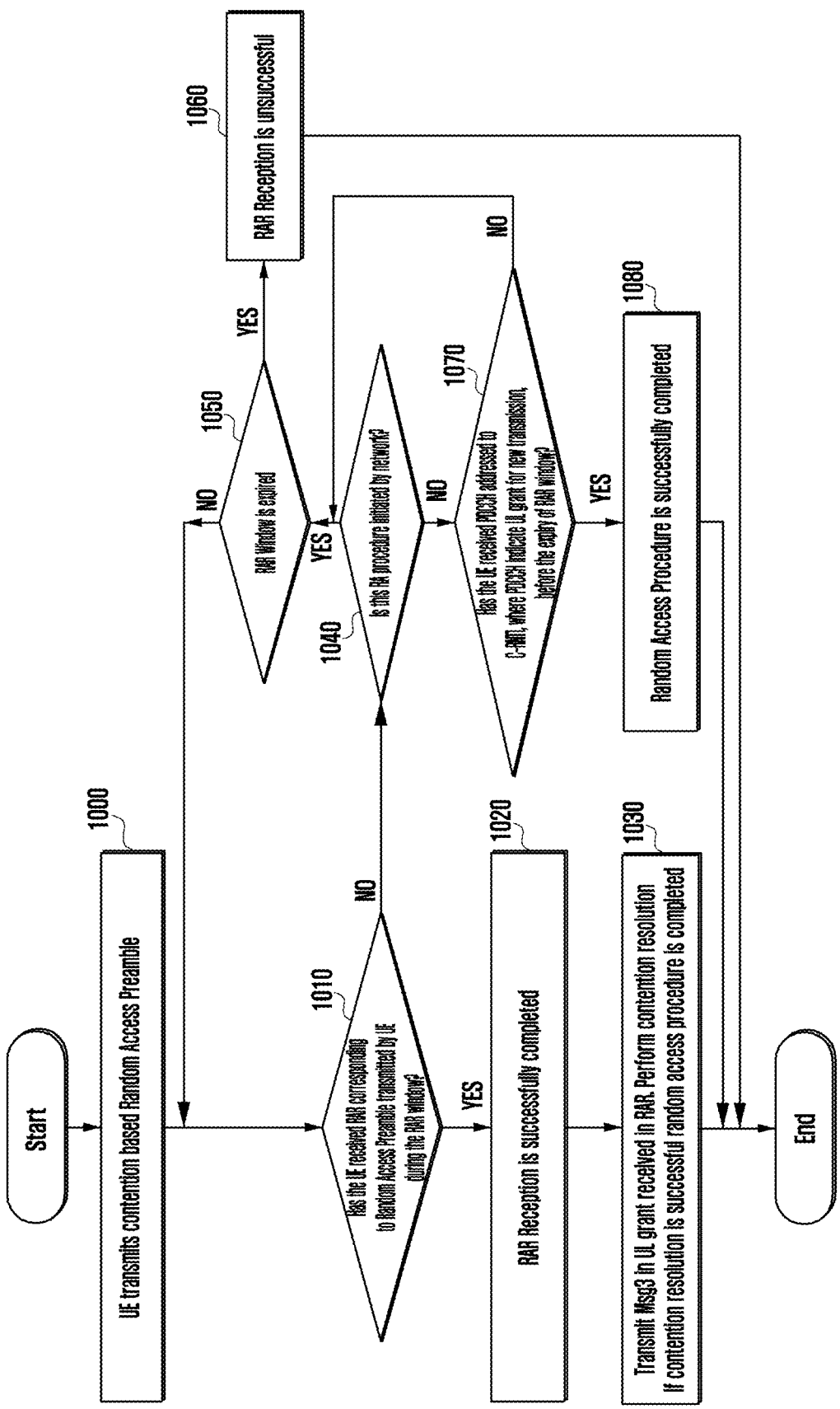
FIG. 10 illustrates a UE operation of a random access procedure according to an embodiment of the disclosure.

FIG. 10 illustrates a UE operation of a random access procedure according to an embodiment of the disclosure.

In alternate embodiment of the present disclosure, the enhanced procedure is illustrated in FIG. 10.

Referring to FIG. 10, a UE transmits the contention based random access preamble in step 1000.

UE monitor for PDCCH addressed to RA-RNTI after transmitting the contention based random access preamble in step 1000.

In step 1010, the UE identifies whether that the UE has received RAR corresponding to random access preamble transmitted by the UE during the RAR window.

In step 1020, the UE identifies that RAR reception is successfully completed in case that the UE has received RAR corresponding to random access preamble transmitted by the UE during the RAR window in step 1010.

In step 1030, the UE transmits Msg3 in UL grant received in RAR and perform contention resolution. If the contention resolution is successful, random access procedure is completed.

For example, until the RAR window is expired, if the UE receives a PDCCH addressed to RA-RNTI corresponding to transmitted random access preamble and TB is successfully decoded and the TB includes RAR carrying the RAPID of transmitted random access preamble, RAR is considered as successfully received. The UE transmits Msg3 in UL grant received in RAR and perform contention resolution. If the contention resolution is successful, random access procedure is completed.

In step 1040, the UE identifies whether that RA procedure is initiated by network in case that the UE has not received RAR corresponding to random access preamble transmitted by the UE during the RAR window in step 1010.

In step 1050, the UE identifies whether that RAR window is expired in case that the RA procedure is initiated by network in step 1040.

In step 1060, the UE identifies that the RAR reception is considered unsuccessful in case that that RAR window is expired in step 1050.

The UE operation goes to the step 1010, in case that RAR window is not expired in step 1050.

In step 1070, the UE identifies whether that the UE has received a PDCCH addressed to C-RNTI, where received PDCCH indicates UL grant for new transmission, before the expiry of RAR window, in case that the RA procedure is not initiated by network in step 1040.

The UE operation goes to the step 1040, in case that the UE has not received a PDCCH addressed to C-RNTI, where received PDCCH indicates UL grant for new transmission, before the expiry of RAR window in step 1070.

For example, the PDCCH addressed to C-RNTI is also monitored if the UE has a valid C-RNTI and this random access process is not initiated by network (i.e., by PDCCH order from a gNB).

In step 1080, the UE identifies that the random access procedure is considered successfully completed in case that the UE has received a PDCCH addressed to C-RNTI, where received PDCCH indicates UL grant for new transmission, before the expiry of RAR window in step 1070.

Until the RAR window is expired, if the UE receives a PDCCH addressed to C-RNTI, where received PDCCH indicates UL grant for new transmission, random access procedure is considered completed.

Figure 11:
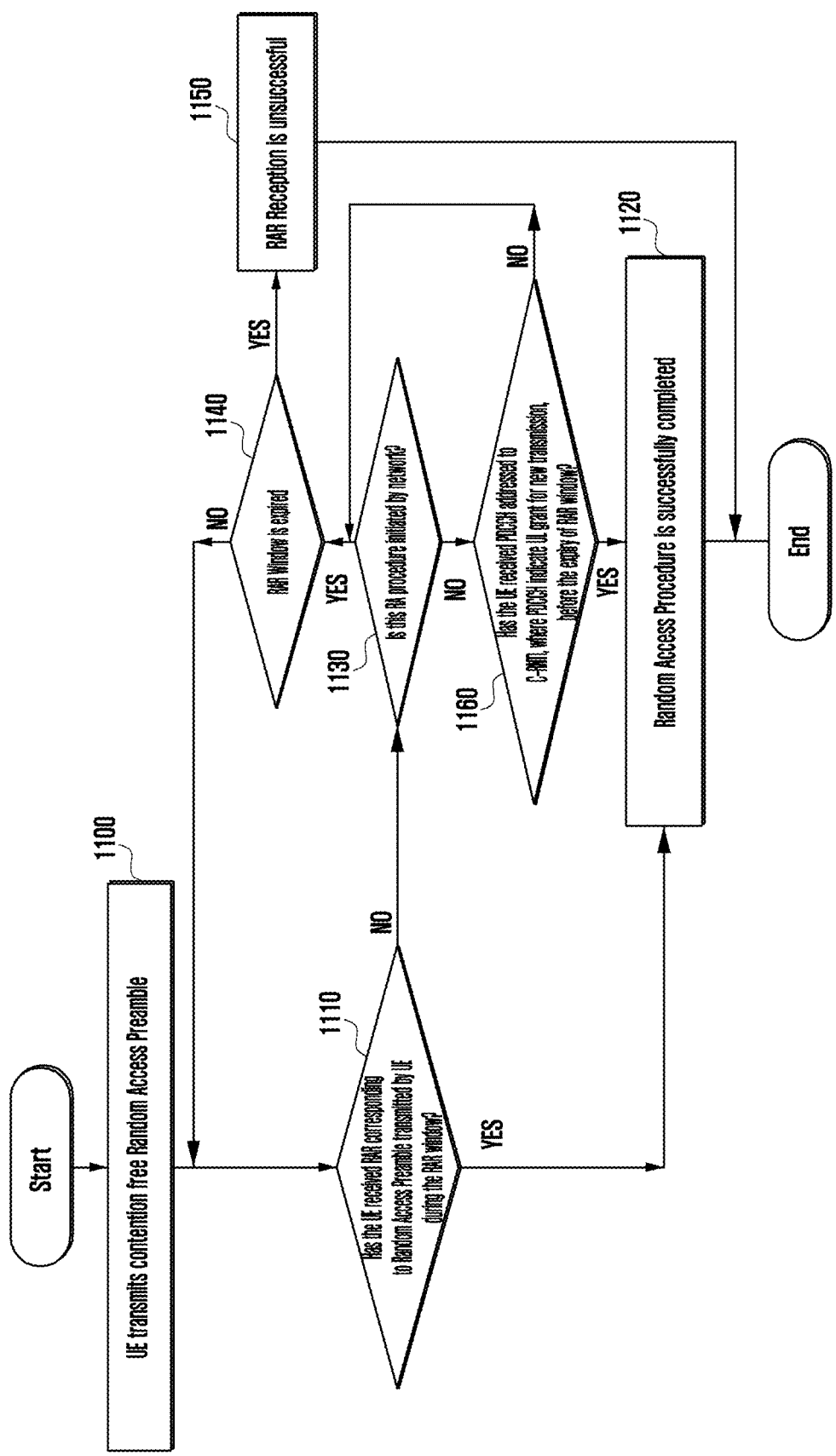
FIG. 11 illustrates a UE operation of a random access procedure according to an embodiment of the disclosure.

FIG. 11 illustrates a UE operation of a random access procedure according to an embodiment of the disclosure.

In one embodiment of the present disclosure, the enhanced procedure is illustrated in FIG. 11.

Referring to FIG. 11, the UE transmits the contention free random access preamble in step 1100.

In step 1110, the UE identifies whether that the UE has received RAR corresponding to random access preamble transmitted by the UE during the RAR window.

In step 1120, the UE identifies that random access procedure is successfully completed in case that the UE has received RAR corresponding to random access preamble transmitted by the UE during the RAR window in step 1110.

For example, until the RAR window is expired, if the UE receives a PDCCH addressed to RA-RNTI corresponding to transmitted random access preamble and TB is successfully decoded and the TB includes RAR carrying the RAPID of transmitted random access preamble, RAR is considered as successfully received and random access procedure is completed.

In step 1130, the UE identifies whether that RA procedure is initiated by a network in case that the UE has not received RAR corresponding to random access preamble transmitted by the UE during the RAR window in step 1110.

In step 1140, the UE identifies whether that RAR window is expired in case that the RA procedure is initiated by network in step 1130.

In step 1150, the UE identifies that the RAR reception is considered unsuccessful in case that that RAR window is expired in step 1140.

The UE operation goes to the step 1110, in case that RAR window is not expired in step 1140.

In step 1160, the UE identifies whether that the UE has received a PDCCH addressed to C-RNTI, where received PDCCH indicates UL grant for new transmission, before the expiry of RAR window, in case that the RA procedure is not initiated by network in step 1130.

For example, the UE monitor for PDCCH addressed to RA-RNTI after transmitting the contention free random access preamble. The PDCCH addressed to C-RNTI is also monitored if the UE has a valid C-RNTI and this random access process is not initiated by network (i.e., by PDCCH order from a gNB.

The UE operation goes to the step 1120, in case that the UE has received a PDCCH addressed to C-RNTI, where received PDCCH indicates UL grant for new transmission, before the expiry of RAR window in step 1160.

For example, until the RAR window is expired, if the UE receives a PDCCH addressed to C-RNTI, where received PDCCH indicates UL grant for new transmission, random access procedure is considered completed.

The UE operation goes to the step 1130, in case that the UE has not received a PDCCH addressed to C-RNTI, where received PDCCH indicates UL grant for new transmission, before the expiry of RAR window in step 1160.

In another embodiment of the present disclosure is associated with ra-OccasionList For contention free RA, a gNB signals csirs-ResourceList as shown below in Table 4 RACH-ConfigDedicated IE of RRC reconfiguration message.

The list csirs-ResourceList incudes contention free RACH resources for a set of channel state information (CSI) RSs. Each entry in this list maps a CSI RS with a set of RACH occasions indicated by ra-OccasionList which is a list of integers. The mapping between these integers and RACH occasions is undefined.

OFDM symbols stating from OFDM symbol 0 to 3 and from 11 to 14. There are 4 frequency division multiplexed (FDMed) RACH occasions.

Figure 13:
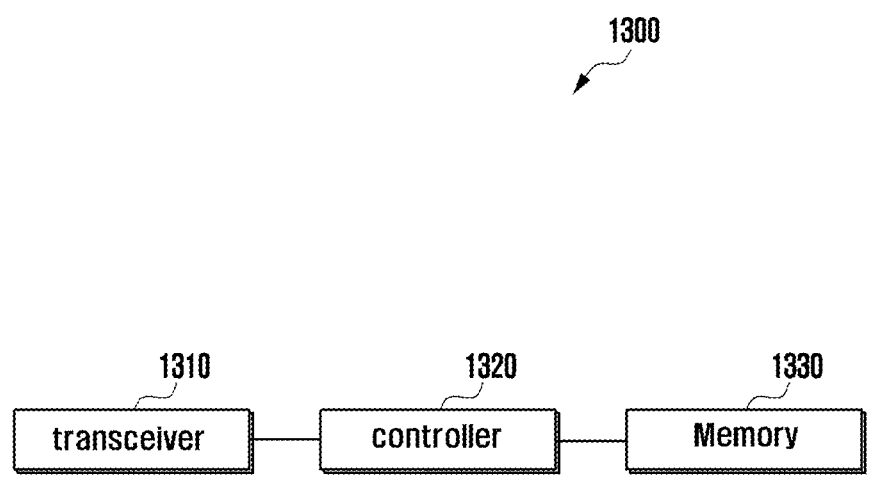
FIG. 13 illustrates a UE apparatus according to an embodiment of the disclosure.

FIG. 13 illustrates a UE apparatus according to an embodiment to the disclosure.

Referring to FIG. 13, the UE 1300 includes a transceiver 1310, a controller 1320 and a memory 1330. Alternatively, the transceiver may be implemented as a transmitter and a receiver, and each component may be implemented through one or more processors.

The transceiver 1310 is configured to receive and transmit signal, data and control information associated with a SI request or a random access procedure.

The transceiver 1310 is configured to transmit a random access preamble and receive a random access response and scheduled transmission.

The transceiver 1310 is configured to receive, from a base station, configuration information for a system information (SI) request by higher layer signaling, the configuration information including information on a SI request period comprising of a number of association periods.

The transceiver 1310 is configured to transmit, to the base station, the SI request for the SI message based on the information on the SI request resource.

The controller 1320 is configured to control operation associated with a SI request or a random access procedure above-described embodiments of the disclosure.

The controller 1320 is configured to identify information on a SI request resource corresponding to a SI message based on the configuration information, the information on the SI request resource including an index of an association period in the SI request period, information on a random access preamble, and information on a RACH occasion.

The random access preamble is identified based on information on a number of synchronization signal blocks (SSBs) per RACH occasion included in the configuration information The association period comprises at least one PRACH configuration period such that a number of SSBs is mapped

TABLE 4

| | |
|---|---|
| csirs-ResourceList | SEQUENCE (SIZE(1..maxRA-CSIRS-Resources)) OF CFRA-CSIRS-Resource, |
| CFRA-CSIRS-Resource ::= | SEQUENCE { |
| csi-RS | CSI-RS-Index, |
| ra-OccasionList | SEQUENCE (SIZE(1..maxRA-OccasionsPerCSIRS)) OF INTEGER (0..maxRA-Occasions-1), |
| ra-PreambleIndex | INTEGER (0..63), |
| ... | |
| } | |

In one embodiment, it may be provided that each RACH occasion in RACH Configuration period is sequentially numbered, first, in increasing order of frequency resource indexes for frequency multiplexed PRACH occasions; Second, in increasing order of time resource indexes for time multiplexed PRACH occasions within a PRACH slot and third, in increasing order of indexes for PRACH slots. So, a UE numbers the RACH occasions in a RACH configuration period as per the rule above and identifies the RACH occasion corresponding to CSI RS using RACH occasion index and provided mapping rule.

Figure 12:
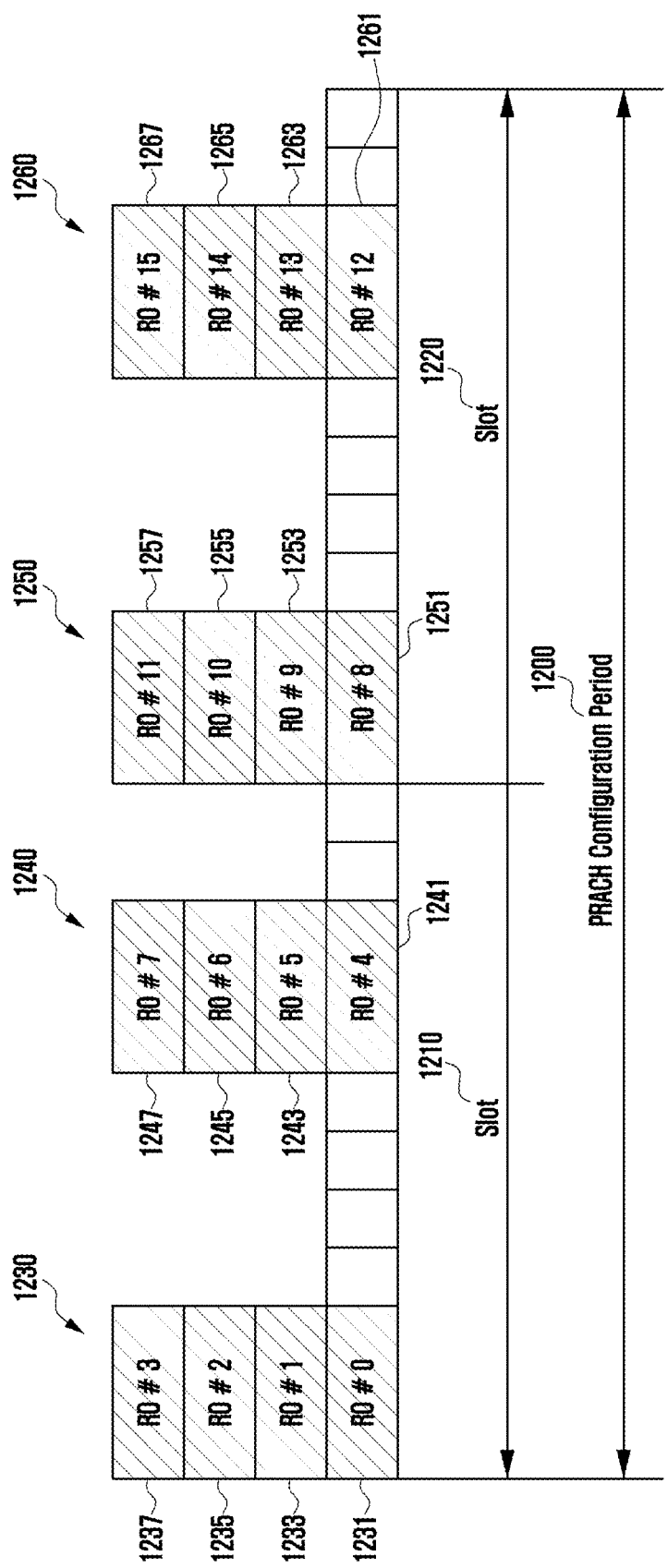
FIG. 12 illustrates RACH occasions associated with PRACH slot according to an embodiment of the disclosure.

FIG. 12 illustrates RACH Occasions associated with PRACH slot according to an embodiment of the disclosure.

An example is shown in FIG. 12, a PRACH configuration period includes two slots. One RACH occasion spans 4 at least once to at least one RACH occasions within the association period, wherein the number of SSB is received through the higher layer signaling.

A number of at least one RACH occasions in the PRACH configuration period is identified based on the configuration information.

The RACH occasion is selected from at least one RACH occasion corresponding to a synchronization signal block (SSB) in the association period based on the information on the RACH occasion.

The memory 1330 is configured to store information associated with SI request or random access procedure above-described embodiments of the disclosure.

Figure 14:
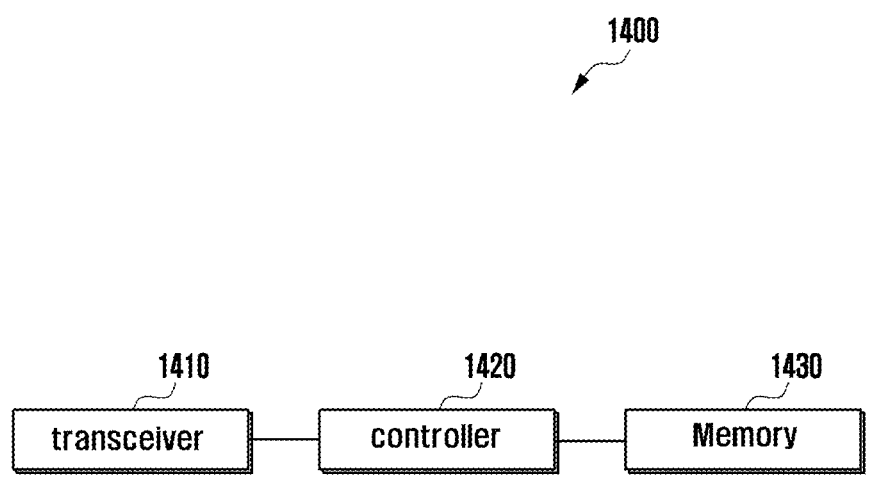
FIG. 14 illustrates a base station apparatus according to an embodiment of the disclosure.

FIG. 14 illustrates a base station apparatus according to an embodiment of the disclosure.

Referring to FIG. 14, the base station 1400 includes a transceiver 1410, a controller 1420 and a memory 1430. Alternatively, the transceiver may be implemented as a transmitter and a receiver, and each component may be implemented through one or more processors.

The transceiver 1410 is configured to receive and transmit signal, data and control information associated with a SI request or a random access procedure.

The transceiver 1410 is configured to receive a random access preamble and transmit a random access response and scheduled transmission.

The transceiver 1410 is configured to transmit, to a user equipment (UE), configuration information for a system information (SI) request by higher layer signaling, the configuration information including information on a SI request period comprising of a number of association period and information on a SI request resource corresponding to a SI message.

The transceiver 1410 is configured to receive, from the UE, the SI request for the SI message based on the information on the SI request resource.

The information on the SI request resource including an index of an association period in the SI request period, information on a random access preamble, and information on a RACH occasion.

The random access preamble is identified based on information on a number of synchronization signal blocks (SSBs) per RACH occasion included in the configuration information.

The association period comprises at least one PRACH configuration period such that a number of SSBs is mapped at least once to at least one RACH occasions within the association period, wherein the number of SSBs is transmitted through the higher layer signaling.

A number of at least one RACH occasions in the PRACH configuration period is identified based on the configuration information.

The RACH occasion is selected from at least one RACH occasion corresponding to a synchronization signal block (SSB) in the association period based on the information on the RACH occasion.

The controller (1420) is configured to control operation associated with a SI request or a random access procedure above-described embodiments of the disclosure.

The memory 1430 is configured to store information associated with a SI request or a random access procedure above-described embodiments of the disclosure.

The above-described embodiments of the disclosure and the accompanying drawings have been provided only as specific examples in order to assist in understanding the disclosure and do not limit the scope of the disclosure. Accordingly, those skilled in the art to which the disclosure pertains will understand that other change examples based on the technical idea of the disclosure may be made without departing from the scope of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

The operations performed by the module, programming module, or any other component according to various embodiments may be executed sequentially, in parallel, repeatedly, or by a heuristic method. Additionally, some operations may be executed in different orders or omitted, or any other operation may be added.

The methods of the embodiments illustrated in FIGS. 1 to 12 can include a combination of methods from more than one illustration. For example, FIGS. 1 to 12 illustrate operations related to a random access procedure and based on various embodiments, the methods can include a combination of methods from more than one illustration.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
receiving, from a base station, system information including information on a scheduling information list of at least one system information (SI) message and configuration information for an SI request, the configuration information including first information on an SI request period in number of association periods and second nformation on a list of at least one SI request resource, wherein the second information includes information on an index of an association period in the SI request period and information for selecting a physical random access channel (PRACH) occasion within the association period, for each SI request resource, and wherein synchronization signal blocks (SSBs) transmitted in a cell of the base station are mapped at least once to the PRACH occasion within the association period;
identifying an SI request resource an SI message based on the first information and the second information; and
transmitting, to the base station, an SI request for the SI message using the identified SI request resource,
wherein the association period includes at least one PRACH configuration period, and a PRACH configuration period includes at least one PRACH occasion,
wherein, in case that an entry in the list is more than 1, a first entry in the list of the at least one SI request resource corresponds to a first SI message in the scheduling information list for which a status of not broadcasting is set, and a second entry in the list of the at least one SI request resource corresponds to a second SI message in the scheduling information list for which a status of not broadcasting is set.

2. The method of claim 1,
wherein, in case that only one entry is in the list, the one entry in the list is used for requesting all SI messages for which the status of not broadcasting is set.

3. The method of claim 1,
wherein the second information further includes information on a preamble start index, for each SI request resource, and
wherein a random access preamble used for requesting the SI message is identified based on the information on the preamble start index and information on a number of SSBs per PRACH occasion included in the configuration information.

4. The method of claim 1,
wherein information on a number of the SSBs is received from the base station through a higher layer signaling, and
wherein the PRACH occasions are identified based on information on a PRACH configuration included in the configuration information.

5. The method of claim 1,
wherein the PRACH occasion is selected from one or more PRACH occasions corresponding to a selected SSB within the association period based on the information for selecting the PRACH occasion.

6. A method performed by a base station in a wireless communication system, the method comprising:
transmitting, to a terminal, system information including information on a scheduling information list of at least one system information (SI) message and configuration information for an SI request, the configuration information including first information on an SI request period in number of association periods and second information on a list of at least one SI request resource, wherein the second information includes information on an index of an association period in the SI request period and information for selecting a physical random access channel (PRACH) occasion within the association period, for each SI request resource, and wherein synchronization signal blocks (SSBs) transmitted in a cell of the base station are mapped at least once to PRACH occasions within the association period; and
receiving, from the terminal, an SI request for an SI message on an SI request resource, based on the first information and the second information,
wherein the association period includes at least one PRACH configuration period, and a PRACH configuration period includes at least one PRACH occasion,
wherein, in case that an entry in the list is more than 1, a first entry in the list of the at least one SI request resource corresponds to a first SI message in the scheduling information list for which a status of not broadcasting is set, and a second entry in the list of the at least one SI request resource corresponds to a second SI message in the scheduling information list for which a status of not broadcasting is set.

7. The method of claim 6,
wherein, in case that only one entry is in the list, the one entry in the list is used for requesting all SI messages for which the status of not broadcasting is set.

8. The method of claim 6,
wherein the second information further includes information on a preamble start index, for each SI request resource, and
wherein a random access preamble used for requesting the SI message is identified based on the information on the preamble start index and information on a number of SSBs per PRACH occasion included in the configuration information.

9. The method of claim 6,
wherein information on a number of the SSBs is received from the base station through a higher layer signaling, and
wherein the PRACH occasions are identified based on information on a PRACH configuration included in the configuration information.

10. The method of claim 6,
wherein the PRACH occasion is selected from one or more PRACH occasions corresponding to a selected SSB within the association period based on the information for selecting the PRACH occasion.

11. A terminal in a wireless communication system, the terminal comprising:
a transceiver; and
a controller configured to:
control the transceiver to receive, from a base station, system information including information on a scheduling information list of at least one system information (SI) message and configuration information for an SI request, the configuration information including first information on an SI request period in number of association periods and second information on a list of at least one SI request resource, wherein the second information includes information on an index of an association period in the SI request period and information for selecting a physical random access channel (PRACH) occasion within the association period, for each SI request resource, and wherein synchronization signal blocks (SSBs) transmitted in a cell of the base station are mapped at least once to PRACH occasions within the association period,
identify an SI request resource for an SI message based on the first information and the second information, and
control the transceiver to transmit, to the base station, an SI request for the SI message using the identified SI request resource,
wherein the association period includes at least one PRACH configuration period, and a PRACH configuration period includes at least one PRACH occasion,
wherein, in case that an entry in the list is more than 1, a first entry in the list of the at least one SI request resource corresponds to a first SI message in the scheduling information list for which a status of not broadcasting is set, and a second entry in the list of the at least one SI request resource corresponds to a second SI message in the scheduling information list for which a status of not broadcasting is set.

12. The terminal of claim 11,
wherein, in case that only one entry is in the list, the one entry in the list is used for requesting all SI messages for which the status of not broadcasting is set.

13. The terminal of claim 11,
wherein the second information further includes information on a preamble start index, for each SI request resource, and
wherein the controller is further configured to identify a random access preamble used for requesting the SI message based on the information on the preamble start index and information on a number of SSBs per PRACH occasion included in the configuration information.

14. The terminal of claim 11,
wherein information on a number of the SSBs is received from the base station through a higher layer signaling, and
wherein the controller is further configured to identify the PRACH occasions based on information on a PRACH configuration included in the configuration information.

15. The terminal of claim 11,
wherein the PRACH occasion is selected from one or more PRACH occasions corresponding to a selected SSB within the association period based on the information for selecting the PRACH occasion.

16. A base station in a wireless communication system, the base station comprising:
a transceiver; and
a controller configured to:
control the transceiver to transmit, to a terminal, system information including information on a scheduling information list of at least one system information (SI) message and configuration information for an SI request, the configuration information including first information on an SI request period in number of association periods and second information on a list of at least one SI request resource, wherein the second information includes information on an index of an association period in the SI request period and information for selecting a physical random access channel (PRACH) occasion within the association period, for each SI request resource, and wherein synchronization signal blocks (SSBs) transmitted in a cell of the base station are mapped at least once to PRACH occasions within the association period, and control the transceiver to receive, from the terminal, an SI request for an SI message on an SI request resource, based on the first information and the second information, wherein the association period includes at least one PRACH configuration period, and a PRACH configuration period includes at least one PRACH occasion, wherein, in case that an entry in the list is more than 1, a first entry in the list of the at least one SI request resource corresponds to a first SI message in the scheduling information list for which a status of not broadcasting is set, and a second entry in the list of the at least one SI request resource corresponds to a second SI message in the scheduling information list for which a status of not broadcasting is set.

17. The base station of claim 16,
wherein, in case that only one entry is in the list, the one entry in the list is used for requesting all SI messages for which the status of not broadcasting is set.

18. The base station of claim 16,
wherein the second information further includes information on a preamble start index, for each SI request resource, and wherein a random access preamble used for requesting the SI message is identified based on the information on the preamble start index and information on a number of SSBs per PRACH occasion included in the configuration information.

19. The base station of claim 16,
wherein information on a number of the SSBs is received from the base station through a higher layer signaling, and wherein the PRACH occasions are identified based on information on a PRACH configuration included in the configuration information.

20. The base station of claim 16,
wherein the PRACH occasion is selected from one or more PRACH occasions corresponding to a selected SSB within the association period based on the information for selecting the PRACH occasion.

* * * * *

UNITED STATES PATENT AND TRADEMARK OFFICE
CERTIFICATE OF CORRECTION

PATENT NO. : 11,696,339 B2
APPLICATION NO. : 17/503109
DATED : July 4, 2023
INVENTOR(S) : Agiwal It is certified that error appears in the above-identified patent and that said Letters Patent is hereby corrected as shown below:

In the Claims

Claim 1, Column 26, Line 23, delete "second nformation" and insert -- second information --.

Signed and Sealed this
Sixteenth Day of January, 2024

Katherine Kelly Vidal
Director of the United States Patent and Trademark Office